United States Patent
Tsruya

(10) Patent No.: US 11,671,234 B2
(45) Date of Patent: Jun. 6, 2023

(54) RADIO TRANSCEIVER CONFIGURED FOR FULL DUPLEX COMMUNICATION OVER A COMMON FREQUENCY BAND AND AN ASSOCIATED METHOD

(71) Applicant: ELBIT SYSTEMS C4I AND CYBER LTD., Netanya (IL)

(72) Inventor: Shalom Tsruya, Netanya (IL)

(73) Assignee: Shalom TSRUYA, Netanya (IL)

( * ) Notice: Subject to any disclaimer, the term of this patent is extended or adjusted under 35 U.S.C. 154(b) by 0 days.

(21) Appl. No.: 18/049,635

(22) Filed: Oct. 26, 2022

(65) Prior Publication Data
US 2023/0083966 A1 Mar. 16, 2023

Related U.S. Application Data

(63) Continuation of application No. PCT/IL2021/050088, filed on Jan. 26, 2021.

(30) Foreign Application Priority Data

Apr. 30, 2020 (IL) .......................................... 274384

(51) Int. Cl.
*H04B 1/525* (2015.01)
*H04L 5/14* (2006.01)
*H04W 28/04* (2009.01)

(52) U.S. Cl.
CPC ............. *H04L 5/14* (2013.01); *H04B 1/525* (2013.01); *H04W 28/04* (2013.01)

(58) Field of Classification Search
CPC ..... H04W 28/04; H04W 76/14; H04W 28/26; H04W 4/08; H04L 5/14; H04L 41/0803; H04B 1/525; H04B 7/2656
See application file for complete search history.

(56) References Cited

U.S. PATENT DOCUMENTS

2004/0002801 A1 2/2004 Cain
2007/0000894 A1 1/2007 Belcea
(Continued)

FOREIGN PATENT DOCUMENTS

WO 2013105085 A1 7/2013
WO 2021220258 A1 11/2021

OTHER PUBLICATIONS

Self-interference-cancelation-based SLNR precoding design for full-duplex relay-assisted system. IEEE Transactions on Vehicular Technology 67.9 (May 25, 2018): 8249-8262. Han, Shuai, et al. May 25, 2018 (May 25, 2018) Whole document.
(Continued)

*Primary Examiner* — Syed Ali

(57) ABSTRACT

A radio transceiver that includes a multi-channel receiver, a multi-channel transmitter and a controller is disclosed. The multi-channel receiver can be configured to concurrently receive first data frames, each including: (a) first data slots that are received over a first frequency channel that is variable between the first data slots, and (b) an error correction code (ECC). Concurrently, the multi-channel transmitter can be configured to transmit second data frames, each including second data slots that are transmitted over a second frequency channel that is variable between the second data slots, the first frequency channel and the second frequency channel being within a common frequency band. The controller can be configured to use the ECC of a respective first data frame of the first data frames to correct self-interference-based errors in the respective first data frame resulting from the transmission of one or more of the second data frames.

21 Claims, 16 Drawing Sheets

(56) References Cited

U.S. PATENT DOCUMENTS

| | | | |
|---|---|---|---|
| 2008/0019298 A1 | 1/2008 | Rudnick | |
| 2010/0142447 A1* | 6/2010 | Schlicht | H04W 4/20 |
| | | | 370/328 |
| 2013/0008901 A1 | 4/2013 | Alapuranen | |
| 2013/0301688 A1* | 11/2013 | Khandani | H04L 5/14 |
| | | | 375/211 |
| 2014/0024780 A1 | 9/2014 | Wemuth et al. | |
| 2014/0247804 A1* | 9/2014 | Wermuth | H04L 5/0005 |
| | | | 370/330 |
| 2016/0164726 A1* | 6/2016 | Fraser | H04L 41/0803 |
| | | | 370/254 |
| 2016/0359608 A1 | 12/2016 | Noh et al. | |
| 2017/0339569 A1 | 11/2017 | Khandani | |
| 2018/0270884 A1* | 9/2018 | Fraser | H04B 7/2656 |
| 2018/0030279 A1 | 10/2018 | Mishra et al. | |
| 2019/0068320 A1 | 2/2019 | Vojcic et al. | |
| 2019/0097674 A1 | 3/2019 | Grave et al. | |
| 2019/0245565 A1 | 8/2019 | Luo et al. | |
| 2019/0334690 A1* | 10/2019 | Liu | H04L 5/1446 |
| 2019/0349737 A1* | 11/2019 | Lee | H04B 17/327 |
| 2020/0052775 A1* | 2/2020 | Nam | H04B 17/336 |
| 2020/0059821 A1* | 2/2020 | Wirth | H04L 1/1896 |
| 2022/0263635 A1* | 8/2022 | Li | H04W 72/569 |

OTHER PUBLICATIONS

CRAHNs: Cognitive radio ad hoc networks; Ian F. Akyildiz *, Won-Yeol Lee, Kaushik R. Chowdhury Broadband Wireless Networking Laboratory, School of Electrical and Computer Engineering, Georgia Institute of Technology, Atlanta, GA 30332, United States.

Medium access for narrowband wireless ad-hoc networks; requirements and initial approaches; FFI-rapport 2008/01313; Lars Erling Bräten, Mariann Hauge, Jan Erik Voldhaug and Knut Øvsthus; Forsvarets forskningsinstitutt/Norwegian Defence Research Establishment (FFI) Jun. 24, 2008.

* cited by examiner

RADIO TRANSCEIVER CONFIGURED FOR FULL DUPLEX COMMUNICATION OVER A COMMON FREQUENCY BAND AND AN ASSOCIATED METHOD

TECHNICAL FIELD

The invention relates to a radio transceiver configured for full duplex communication over a common frequency band and an associated method.

BACKGROUND

A radio communications network can includes a plurality of transceivers configured for half-duplex communication (i.e., either transmitting or receiving data traffic at any given time). The transceivers can be configured to include a multi-channel receiver, enabling the data traffic capacity in the radio communications network to be increased relative to an alternative configuration in which the transceivers include a single-channel receiver. However, this increase in the data traffic capacity is limited. In particular, the increase in the data traffic capacity is minor, at best, when most of the data traffic in the radio communications network is symmetric multi-point to multi-point data traffic having a long transmission interval (e.g., video transmissions, transmissions of real-time large data, etc.).

There is thus a need in the art to significantly increase the data traffic capacity in a radio communications network.

GENERAL DESCRIPTION

In accordance with a first aspect of the presently disclosed subject matter, there is provided a radio transceiver, in a radio communications network, that is configured for full-duplex communication over a common frequency band, the transceiver comprising: a multi-channel receiver configured to receive, via at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC); a multi-channel transmitter configured to transmit, via at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and a controller configured, for a respective first data frame of the first data frames, to use the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot.

In some cases, the network is a mobile ad-hoc network (MANET).

In some cases, the actual self-interference-based errors in the first data frames are statistically dispersed over the first data frames, thereby enabling the ECC of each first data frame of the first data frames to correct the actual self-interference-based errors in the respective first data frame.

In some cases, the controller is further configured, prior to the first time slots, to: obtain, for the respective first data frame, the first frequency channel over which the first data slots of the respective first data frame are to be received; obtain, for each second data frame of the second data frames, the second frequency channel over which the second data slots of the respective second data frame are to be transmitted; determine, for at least some of the first time slots, a given difference in frequency between the first frequency channel over which a respective first data slot of the respective first data frame is to be received during the respective first time slot and at least one respective second frequency channel over which a respective second data slot of a corresponding second data frame of the second data frames is to be transmitted during the respective first time slot, wherein a determination that the given difference is less than the first difference is indicative of at least one expected self-interference-based error in the respective first data slot of the respective first data frame; and estimate a capability of the ECC of the respective first data frame to correct the expected self-interference-based error, if any, wherein the ECC is estimated to be capable of correcting the expected self-interference-based error when a number of the first data slots of the respective first data frame that are expected to include one or more expected self-interference-based errors is less than or equal to a predefined number.

In some cases, upon estimating that the ECC is not capable of correcting the expected self-interference-based-error, the controller is configured to skip a transmission of the respective second data slot, thereby avoiding the expected self-interference-based error in the respective second data slot.

In some cases, the controller is further configured to modify a transmission of the corresponding second data frame to indicate that the transmission of the respective second data slot has been skipped.

In some cases, the controller is configured to determine the predefined number in accordance with one or more of the following: (a) a type of the ECC; (b) a code rate of the ECC; (c) an expected signal-to-noise ratio (SNR) for the respective first data frame, the expected SNR being estimated based on a measured SNR of data transmissions received by the receiver prior to the first time slots; or (d) an expected effect of radio-frequency interference that is external to the radio transceiver on the multi-channel receiver.

In some cases, the receiver comprises: a reception filter bank, configured to process each of the first data frames based on the first frequency channel thereof, the reception filter bank comprising a plurality of first filters that are associated with distinct frequency channels throughout the common frequency band; and a demodulator configured to demodulate the first data frames.

In some cases, the first filters include at least one of: (a) one or more first bandpass filters, or (b) one or more first notch filters.

In some cases, the transmitter comprises: one or more digital transmission channels configured to modulate each of the second data frames for a transmission thereof over the second frequency channel thereof; and a transmission filter bank configured to process each of the second data frames based on the second frequency channel thereof, the transmission filter bank comprising a plurality of second filters that are associated with the distinct frequency channels.

In some cases, the second filters include at least one of: (a) one or more second bandpass filters, or (b) one or more second notch filters.

In some cases, the receiver further comprises: a self-interference compensation unit configured to compensate for an effect of self-interference on one or more of the first data frames resulting from a transmission of one or more of the second data frames, thereby reducing the first difference.

In some cases, the self-interference compensation unit comprises: a compensation filter bank, coupled to an output of the multi-channel transmitter, and configured to process each of the second data frames based on the second frequency channel thereof, the compensation filter bank comprising a plurality of third filters that are associated with the distinct frequency channels; and a cancellation unit configured, based on the first data frames and the second data frames, to remove components of the second data frames that are present in the first data frames.

In accordance with a second aspect of the presently disclosed subject matter, there is provided a radio communications network comprising a plurality of radio transceivers that are configured for full-duplex communication over a common frequency band, each radio transceiver of the radio transceivers comprising: a multi-channel receiver configured to receive, via at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC); a multi-channel transmitter configured to transmit, via at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and a controller configured, for a respective first data frame of the first data frames, to use the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot.

In accordance with a third aspect of the presently disclosed subject matter, there is provided a method for full-duplex communication over a common frequency band, the method comprising: receiving, by a multi-channel receiver of a radio transceiver in a radio communications network, via at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC); transmitting, by a multi-channel transmitter of the radio transceiver, via at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and for a respective first data frame of the first data frames, using the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot.

In some cases, the network is a mobile ad-hoc network (MANET).

In some cases, the actual self-interference-based errors in the first data frames are statistically dispersed over the first data frames, thereby enabling the ECC of each first data frame of the first data frames to correct the actual self-interference-based errors in the respective first data frame.

In some cases, the method further comprises: obtaining, for the respective first data frame, prior to the first time slots, the first frequency channel over which the first data slots of the respective first data frame are to be received; obtaining, for each second data frame of the second data frames, prior to the first time slots, the second frequency channel over which the second data slots of the respective second data frame are to be transmitted; determining, for at least some of the first time slots, a given difference in frequency between the first frequency channel over which a respective first data slot of the respective first data frame is to be received during the respective first time slot and at least one respective second frequency channel over which a respective second data slot of a corresponding second data frame of the second data frames is to be transmitted during the respective first time slot, wherein a determination that the given difference is less than the first difference is indicative of at least one expected self-interference-based error in the respective first data slot of the respective first data frame; and estimating a capability of the ECC of the respective first data frame to correct the expected self-interference-based error, if any, wherein the ECC is estimated to be capable of correcting the expected self-interference-based error when a number of the first data slots of the respective first data frame that are expected to include one or more expected self-interference-based errors is less than or equal to a predefined number.

In some cases, upon estimating that the ECC is not capable of correcting the expected self-interference-basederror, the method further comprises: skipping a transmission of the respective second data slot, thereby avoiding the expected self-interference-based error in the respective second data slot.

In some cases, the method further comprises: modifying a transmission of the corresponding second data frame to indicate that the transmission of the respective second data slot has been skipped.

In some cases, the method further comprises: determining the predefined number in accordance with one or more of the following: (a) a type of the ECC; (b) a code rate of the ECC; (c) an expected signal-to-noise ratio (SNR) for the respective first data frame, the expected SNR being estimated based on a measured SNR of data transmissions received by the receiver prior to the first time slots; or (d) an expected effect of radio-frequency interference that is external to the radio transceiver on the multi-channel receiver.

In some cases, the receiving comprises: processing each of the first data frames based on the first frequency channel thereof, by a reception filter bank comprising a plurality of first filters that are associated with distinct frequency channels throughout the common frequency band; and demodulating the first data frames, by a demodulator.

In some cases, the first filters include at least one of: (a) one or more first bandpass filters, or (b) one or more first notch filters.

In some cases, the transmitting comprises: modulating each of the second data frames for a transmission thereof over the second frequency channel thereof, by one or more digital transmission channels; and processing each of the second data frames based on the second frequency channels thereof, by a transmission filter bank comprising a plurality of second filters that are associated with the distinct frequency channels.

In some cases, the second filters include at least one of: (a) one or more second bandpass filters, or (b) one or more second notch filters.

In some cases, the receiving further comprises: compensating for an effect of self-interference on one or more of the first data frames resulting from a transmission of one or more of the second data frames, thereby reducing the first difference.

In some cases, the compensating comprises: processing each of the second data frames based on the second frequency channel thereof, by a compensation filter bank, coupled to an output of the multi-channel transmitter, the compensation filter bank comprising a plurality of third filters that are associated with the distinct frequency channels; and removing components of the second data frames that are present in the first data frames, based on the first data frames and the second data frames.

In accordance with a fourth aspect of the presently disclosed subject matter, there is provided a method for full-duplex communication over a common frequency band in a radio communications network comprising a plurality of radio transceivers, the method comprising: receiving, by at least one multi-channel receiver of a corresponding at least one radio transceiver of the radio transceivers, via a respective at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC); transmitting, by at least one multi-channel transmitter of the corresponding at least one radio transceiver, via a respective at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and for a respective first data frame of the first data frames, using the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot.

In accordance with a fifth aspect of the presently disclosed subject matter, there is provided a non-transitory computer readable storage medium having computer readable program code embodied therewith, the computer readable program code, executable by at least one processor of a computer to perform a method for full-duplex communication over a common frequency band, the method comprising: receiving, by a multi-channel receiver of a radio transceiver in a radio communications network, via at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC); transmitting, by a multi-channel transmitter of the radio transceiver, via at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and for a respective first data frame of the first data frames, using the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot.

In accordance with a sixth aspect of the presently disclosed subject matter, there is provided a non-transitory computer readable storage medium having computer readable program code embodied therewith, the computer readable program code, executable by at least one processor of a computer to perform a method for full-duplex communication over a common frequency band in a radio communications network comprising a plurality of radio transceivers, the method comprising: receiving, by at least one multi-channel receiver of a corresponding at least one radio transceiver of the radio transceivers, via a respective at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC); transmitting, by at least one multi-channel transmitter of the corresponding at least one radio transceiver, via a respective at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and for a respective first data frame of the first data frames, using the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
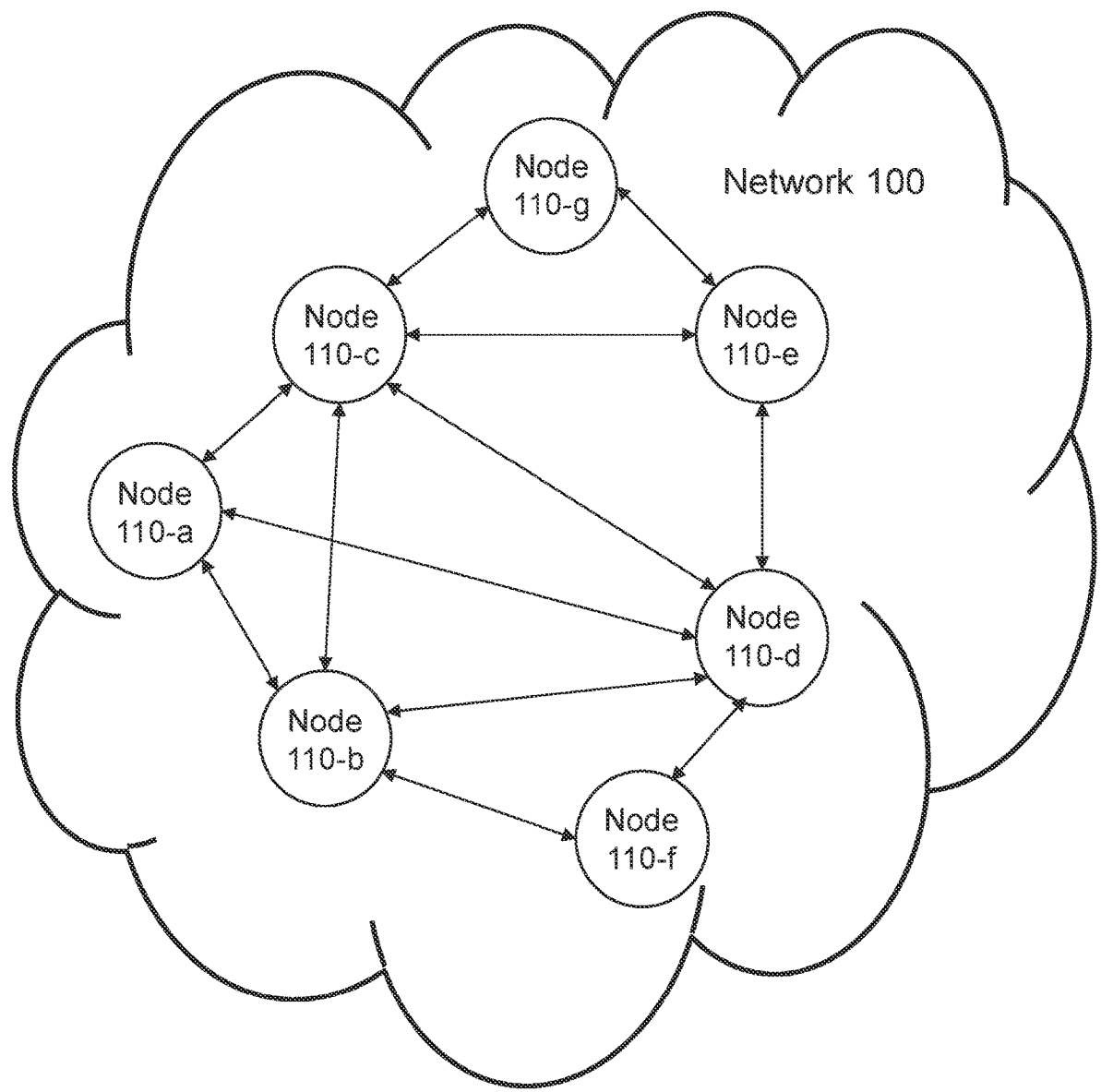
FIG. 1 is a schematic illustration of a radio communications network, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "transmitting", "correcting", "obtaining", "determining", "estimating", "skipping", "modifying", "processing", "digitizing", "monitoring", "demodulating", "modulating", "reconstructing", "compensating", "removing" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 5, 6, 11-14, and 17 may be executed. In embodiments of the presently disclosed subject matter one or more stages illustrated in FIGS. 5 and 6 may be executed in a different order and/or one or more groups of stages may be executed simultaneously. FIGS. 1, 2, 7-10, 15 and 16 illustrate a general schematic of the system architecture in accordance with an embodiment of the presently disclosed subject matter. Each module in FIGS. 1, 2, 7-10, 15 and 16 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIGS. 2, 7-10, 15 and 16.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this is mind, attention is now drawn to FIG. 1, a schematic illustration of a radio communications network 100, in accordance with the presently disclosed subject matter.

In accordance with the presently disclosed subject matter, radio communications network 100 can be configured to include a plurality of nodes (e.g., nodes 110-a, 110-b, . . . , 110-g), being devices in radio communications network 100. In some cases, radio communications network 100 can be a Mobile Ad-hoc Network (MANET). Each of the nodes (e.g., 110-a, 110-b, . . . , 110-g) in the MANET can directly communicate with all other nodes in the MANET and can act as a router for retransmitting packets that are originally transmitted by a different node of the nodes (e.g., 110-a, 110-b, . . . , 110-g) in the MANET. Alternatively, in some cases, radio communications network 100 can be a star network, in which each of the nodes in the radio communications network 100 communicate only via an access point that is common to the nodes in the radio communications network 100.

Each node of the nodes (e.g., nodes 110-a, 110-b, . . . , 110-g) in radio communications network 100 is configured to include a respective radio transceiver (not shown in FIG. 1) for communicating with other nodes (e.g., nodes 110-a, 110-b, . . . , 110-g) in radio communications network 100. The respective radio transceiver is configured to have a full-duplex link over a common frequency band, being the frequency band within the radio spectrum that is allocated to the radio communications network 100. That is, the respective radio transceiver is capable of simultaneously transmitting and receiving data, wherein both data transmissions and data receptions by the respective radio transceiver can occur over any one of a plurality of distinct frequency channels that cover the common frequency band. This enables an increase in the total data traffic in radio communications network 100, the total data traffic being the sum of all transmissions by the radio transceivers in the radio communications network 100.

Figure 2:
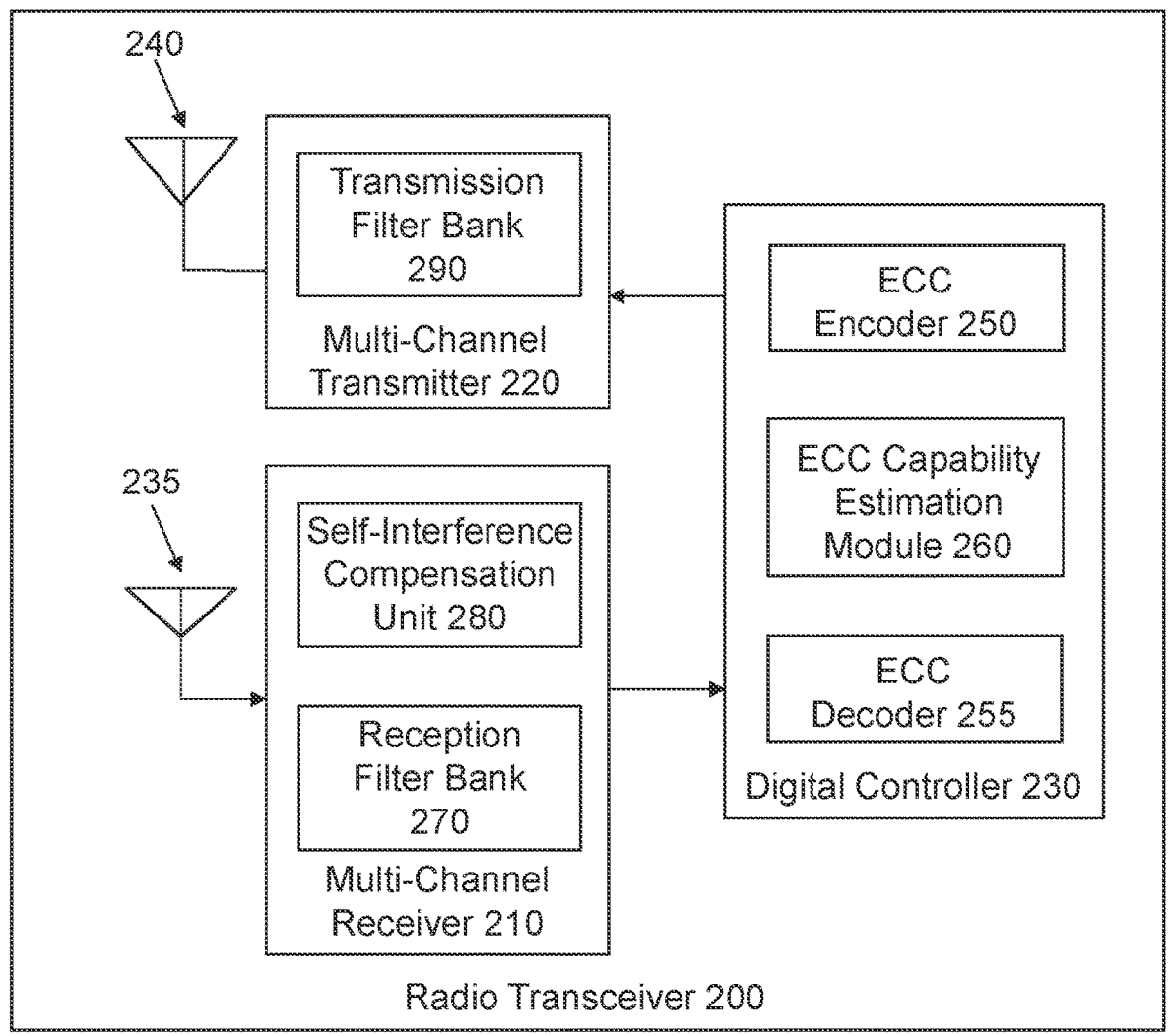
FIG. 2 is a block diagram schematically illustrating one example of a radio transceiver of a given node in the radio communications network, in accordance with the presently disclosed subject matter.

Attention is now drawn to FIG. 2, a block diagram schematically illustrating one example of a radio transceiver 200 of a given node (e.g., 110-a, 110-b, . . . , 110-g) in the radio communications network 100, in accordance with the presently disclosed subject matter.

In accordance with the presently disclosed subject matter, radio transceiver 200 can be configured to include a multi-channel receiver 210, a multi-channel transmitter 220, and a digital controller 230. Multi-channel receiver 210 can be configured to receive, via at least one receiver antenna 235, an input radio signal. The input radio signal can include one or more first data frames that are received from a corresponding one or more first nodes (e.g., nodes 110-a, 110-b, . . . , 110-g) in radio communications network 100 during a common time period (i.e., concurrently), the common time period including a plurality of first time slots. Each first data frame of the first data frames can include a plurality of first data slots. Each first data slot of the first data slots of a respective first data frame can be received during a different first time slot of the first time slots over a distinct frequency channel within the common frequency band.

Each first data frame of the first data frames can include an error correction code (ECC). In some cases, the ECC in a respective first data frame can be distributed. Additionally, or alternatively, in some cases, the bits in the respective first data frame, including the ECC, can be interleaved, to prevent a local concentration of many errors in the respective first data frame, and thereby improve the error correction capability of the ECC.

Multi-channel transmitter 220 can be configured to transmit, via at least one transmitter antenna 240, one or more second data frames to a corresponding one or more second nodes (e.g., nodes 110-*a*, 110-*b*, . . . , 110-*g*) in radio communications network 100 during the common time period. Each second data frame of the second data frames can include a plurality of second data slots. Each second data slot of the second data slots of a respective second data frame can be transmitted during a different first time slot of the first time slots over a distinct frequency channel within the common frequency band. That is, radio transceiver 200 can be configured to have a full-duplex link over the common frequency band, thereby enabling an increase in a total data traffic capacity in radio communications network 100. In some cases, there can be overlap between the first and second nodes. Also, in some cases, the at least one receiver antenna 235 and the at least one transmitter antenna 240 can be the same antenna.

Digital controller 230 can be configured to include an ECC encoder 250. Additionally, in some cases, digital controller 230 can be configured to include an interleaver (not shown). ECC encoder 250 can be configured to encode the information bits in each second data frame of the second data frames with an error correction code (ECC). In some cases, the ECC in a respective second data frame can be distributed. Additionally, or alternatively, in some cases, digital controller 230 can be configured to interleave the bits in the respective second data frame, including the ECC, using the interleaver.

A challenge that arises from the full-duplex operation of the radio transceiver 200 over the common frequency band is a high likelihood of self-interference at the radio transceiver 200, being the reception by the multi-channel receiver 210 of the radio transceiver 200 of components of the second data frames that are transmitted by multi-channel transmitter 220 of the radio transceiver 200. This can result in one or more errors in one or more of the first data frames that are received by multi-channel receiver 210, such errors being referred to hereinafter as self-interference-based errors.

Digital controller 230 can be configured to include an ECC decoder 255. ECC decoder 255 can be configured to use the ECC in a respective first data frame to correct errors in the respective first data frame, including self-interference-based errors. In some cases, digital controller 230 can also be configured to include a deinterleaver (not shown). Deinterleaver can be configured to deinterleave interleaved bits in a respective first data frame prior to the decoding of the respective first data frame by ECC decoder 255.

An additional challenge that arises from the full-duplex operation of the radio transceiver 200 over the common frequency band is to minimize control and management traffic at the radio transceiver 200 while improving the capability of the ECC in each respective first data frame that is received by multi-channel receiver 210 to correct self-interference-based errors in the respective first data frame. To overcome this challenge, for each respective first data frame of the first data frames that are received by multi-channel receiver 210, the distinct frequency channel over which the respective first data frame is received (referred to herein, interchangeably, as "the first frequency channel") can be variable between successive first data slots of the first data slots in the respective first data frame. Moreover, the variation in the first frequency channel between the successive first data slots can be achieved by varying the first frequency channel in accordance with a pseudorandom frequency sequence that is based on a given algorithm or one or more given rules.

Both the node (e.g., 110-*a*, 110-*b*, . . . , 110-*g*) that transmits a respective first data frame and the radio transceiver 200 can be aware, prior to the transmission of the respective first data frame, of the given algorithm or the given rules on which the pseudorandom frequency sequence for the respective first data frame is based. In this manner, digital controller 230 can be configured, prior to the reception of the first data frames during the common time period, to obtain, for each respective first data frame of the first data frames, the first frequency channel over which the first data slots of the respective first data frame are to be received.

In some cases, the given algorithm or the given rules on which a pseudorandom frequency sequence for the respective first data frame is based can be agreed upon by the node (e.g., 110-*a*, 110-*b*, . . . , 110-*g*) that transmits the respective first data frame and the radio transceiver 200 prior to the transmission of the respective first data frame. The given algorithm or the given rules can result in a pseudorandom frequency sequence for the respective first data frame that appears to be random or that appears not to be random.

Moreover, for each respective second data frame of the second data frames that are transmitted by multi-channel transmitter 220, the distinct frequency channel over which the respective second data frame is transmitted (referred to herein, interchangeably, as "the second frequency channel") can be variable between successive second data slots of the second data slots in the respective second data frame. Moreover, the variation in the second frequency channel between the successive second data slots can be achieved by varying the second frequency channel in accordance with a pseudorandom frequency sequence that is based on a given algorithm or one or more given rules.

Both the radio transceiver 200 and the node (e.g., 110-*a*, 110-*b*, . . . , 110-*g*) that receives a respective second data frame can be aware, prior to the transmission of the respective second data frame, of the given algorithm or the given rules on which the pseudorandom frequency sequence for the respective second data frame is based. In this manner, digital controller 230 can be configured, prior to the transmission of the second data frames during the common time period, to obtain, for each respective second data frame of the second data frames, the second frequency channel over which the second data slots of the respective second data frame are to be transmitted.

In some cases, the given algorithm or the given rules on which a pseudorandom frequency sequence for the respective second data frame is based can be agreed upon by the radio transceiver 200 and the node (e.g., 110-*a*, 110-*b*, . . . , 110-*g*) that receives the respective second data frame prior to the transmission of the respective second data frame. The given algorithm or the given rules can result in a pseudorandom frequency sequence for the respective second data frame that appears to be random or that appears not to be random.

In view of the foregoing, the self-interference-based errors in the first data frames can be statistically dispersed over the first data frames, thereby enabling the ECC of each first data frame of the first data frames to correct the self-interference-based errors in the respective first data frame, if any. It is to be noted that each of the self-interference-based errors in a respective first data frame results from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot.

Figure 3:
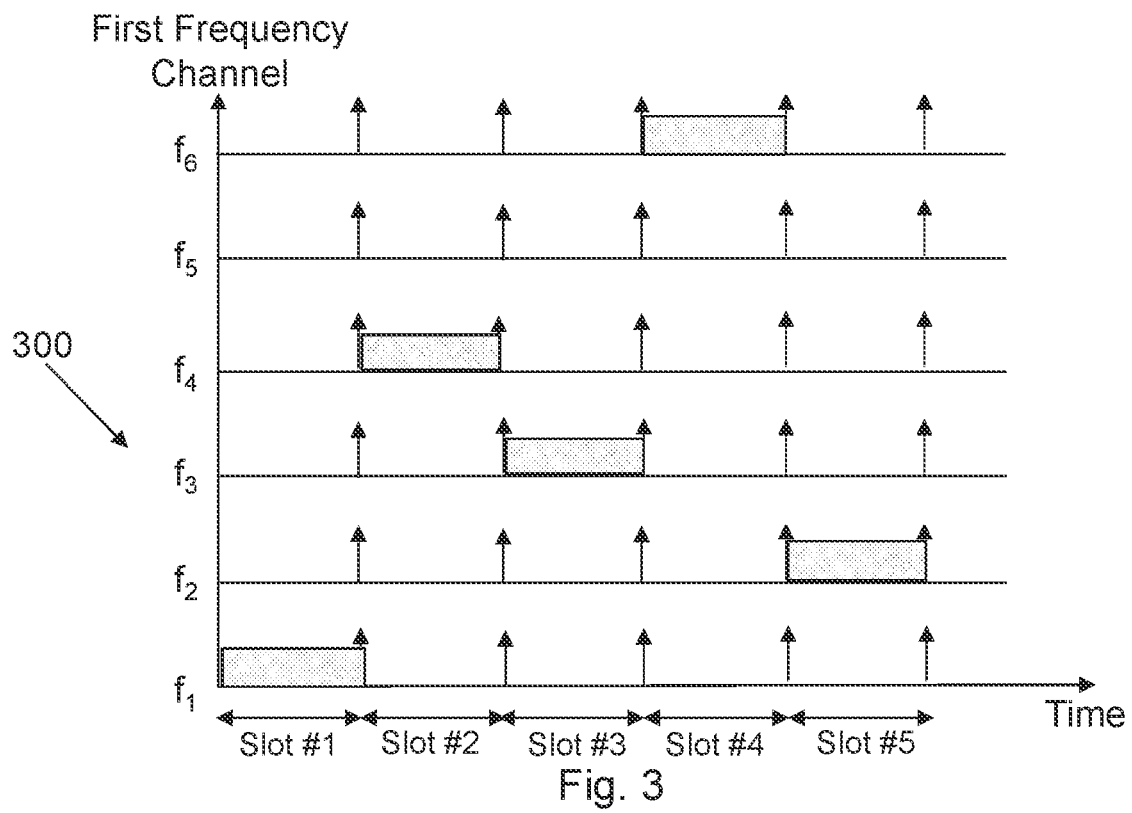
FIG. 3 is a graph that schematically illustrates one example of a frequency profile of a respective first data frame that is received by multi-channel receiver during a common time period, in accordance with the presently disclosed subject matter.
Figure 4:
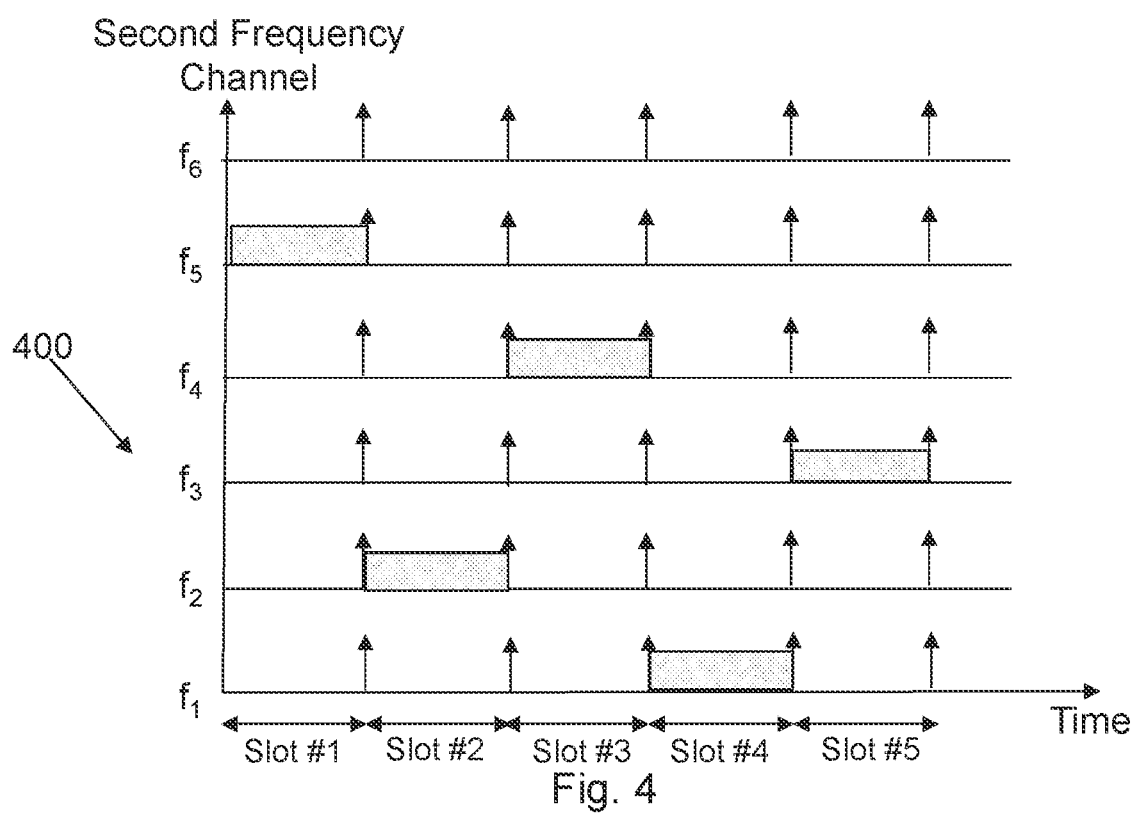
FIG. 4 is a graph that schematically illustrates one example of a frequency profile of a respective second data frame that is transmitted by multi-channel transmitter during the common time period, in accordance with the presently disclosed subject matter.

Attention is now briefly drawn to FIGS. 3 and 4. FIG. 3 is a graph 300 that schematically illustrates one example of a frequency profile of a respective first data frame that is received by multi-channel receiver 210 during a common time period, in accordance with the presently disclosed subject matter. For the purposes of illustration only, FIG. 3 illustrates the common time period as including five first time slots (e.g., Slot #1, Slot #2, Slot #3, Slot #4, Slot #5), and six distinct frequency channels (frequencies $f_1$, $f_2$, $f_3$, $f_4$, $f_5$, $f_6$) within the common frequency band over which respective first data slots of the respective first data frame can be received. FIG. 3 further illustrates that the first data slots of the respective first data frame are received over the following distinct frequency channels in the following order during the five first time slots (e.g., Slot #1, Slot #2, Slot #3, Slot #4, Slot #5): frequencies $f_1$, $f_4$, $f_3$, $f_6$ and $f_2$. As can be seen, the distinct frequency channel (i.e., first frequency channel) over which successive first data slots of the respective first data frame are received is variable between the successive first data slots of the respective first data frame.

FIG. 4 is a graph 400 that schematically illustrates one example of a frequency profile of a respective second data frame that is transmitted by multi-channel transmitter 220 during the common time period, in accordance with the presently disclosed subject matter. For the purposes of illustration only, FIG. 4, like FIG. 3, illustrates the common time period as including five first time slots (e.g., Slot #1, Slot #2, Slot #3, Slot #4, Slot #5), and six distinct frequency channels (frequencies $f_1$, $f_2$, $f_3$, $f_4$, $f_1$, $f_6$) within the common frequency band over which respective second data slots of the respective second data frame can be transmitted. FIG. 4 further illustrates that the second data slots of the respective second data frame are transmitted over the following distinct frequency channels in the following order during the five first time slots (e.g., Slot #1, Slot #2, Slot #3, Slot #4, Slot #5): frequencies $f_5$, $f_2$, $f_4$, $f_1$ and $f_3$. As can be seen, the distinct frequency channel (i.e., the second frequency channel) over which successive second data slots of the respective second data frame are transmitted is variable between the successive second data slots of the respective second data frame.

Returning to FIG. 2, in some cases, digital controller 230 can be further configured to include an ECC capability estimation module 260. ECC capability estimation module 260 can be configured to estimate a capability of the ECC of a respective first data frame to correct expected self-interference-based errors in the respective first data frame, as detailed further herein, inter alia with reference to FIG. 6.

Figure 5:
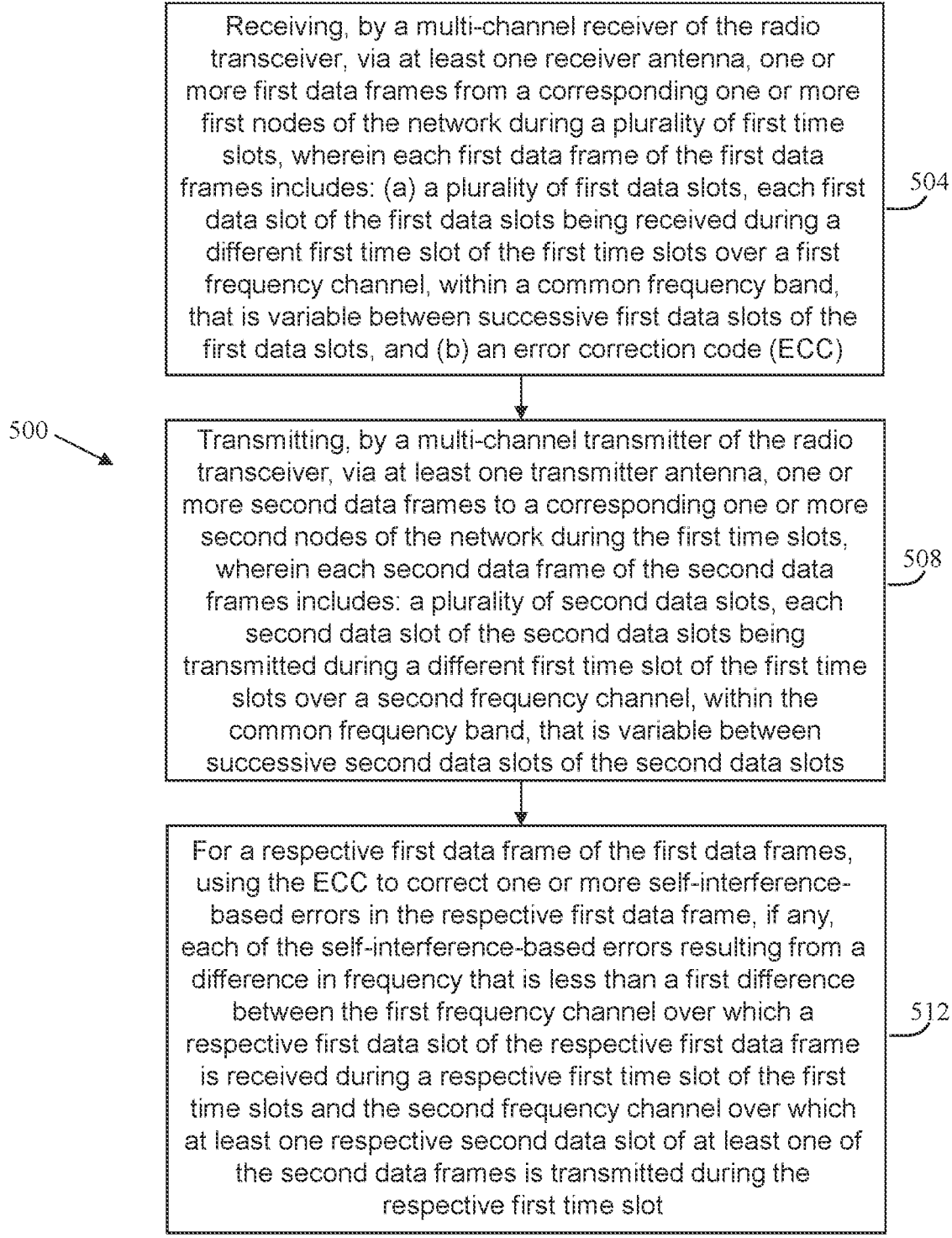
FIG. 5 is a flowchart illustrating one example of a sequence of operations performed by a radio transceiver in the radio communications network, in accordance with the presently disclosed subject matter.

Attention is now drawn to FIG. 5, a flowchart illustrating one example of a sequence of operations performed by a radio transceiver 200 in the radio communications network 100, in accordance with the presently disclosed subject matter.

In accordance with the presently disclosed subject matter, a multi-channel receiver 210 of the radio transceiver 200 can be configured to receive, via at least one receiver antenna 235, one or more first data frames from a corresponding one or more first nodes (e.g., nodes 110-a, 110-b, . . . , 110-g) of the network 100 during a plurality of first time slots (i.e., the common time period), wherein each first data frame of the first data frames includes: (a) a plurality of first data slots, each first data slot of the first data slots being received during a different first time slot of the first time slots over a first frequency channel, within a common frequency band, that is variable between successive first data slots of the first data slots, and (b) an error correction code (ECC) (block 504).

Moreover, a multi-channel transmitter 220 of the radio transceiver 200 can be configured to transmit, via at least one transmitter antenna 240, one or more second data frames to a corresponding one or more second nodes (e.g., nodes 110-a, 110-b, . . . , 110-g) of the network 100 during the first time slots (i.e., the common time period), wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots (block 508).

A digital controller 230 of the radio transceiver 200 can be configured, for a respective first data frame of the first data frames, to use the ECC of the respective first data frame to correct one or more self-interference-based errors in the respective first data frame, if any, each of the self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot (block 512).

Figure 6:
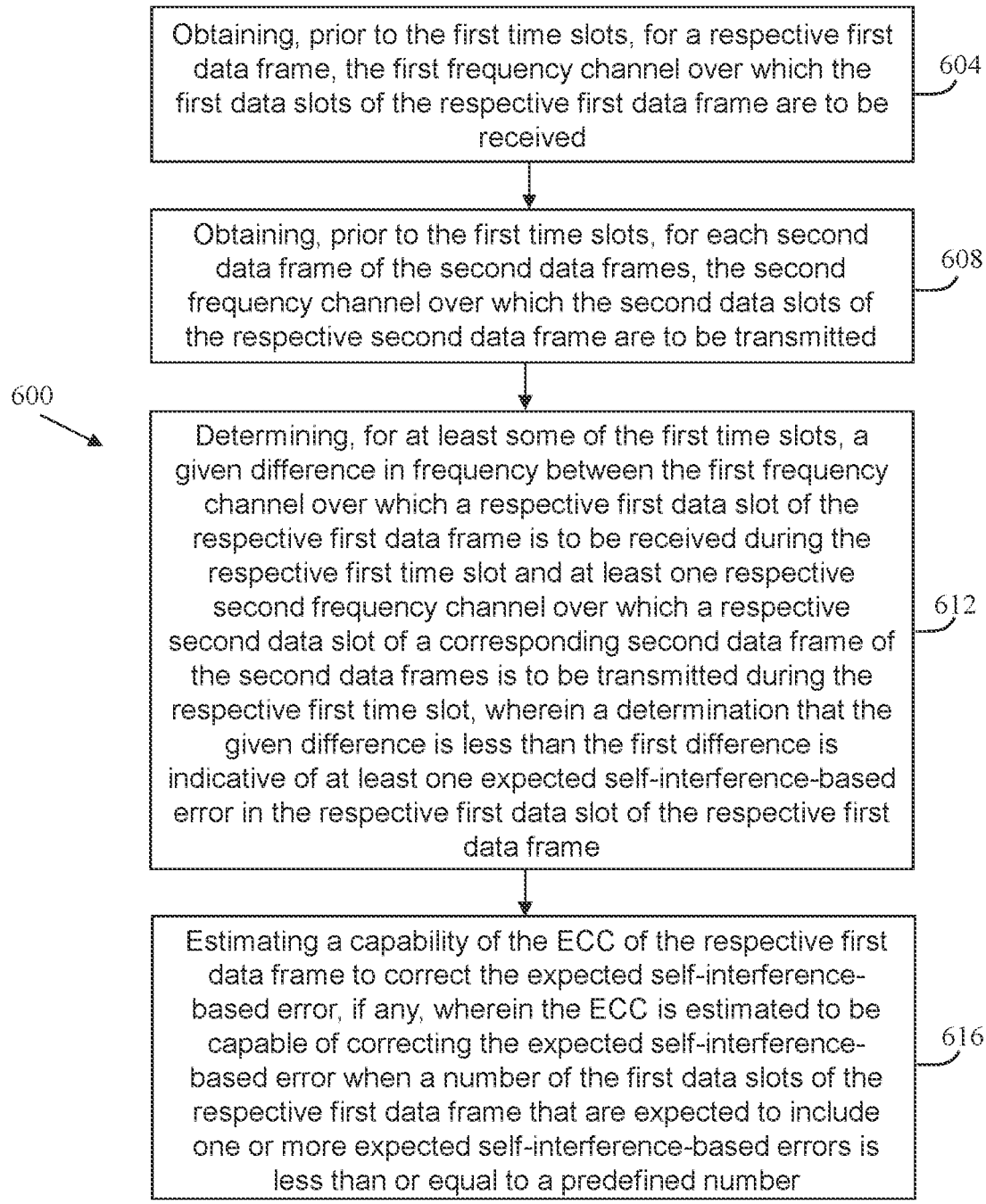
FIG. 6 is a flowchart illustrating one example of a sequence of operations performed by the radio transceiver to estimate a capability of an error correction code (ECC) of a respective first data frame to correct one or more expected self-interference-based errors in the respective first data frame, in accordance with the presently disclosed subject matter.

Attention is now drawn to FIG. 6, a flowchart illustrating one example of a sequence of operations performed by the radio transceiver 200 to estimate a capability of an ECC of a respective first data frame to correct one or more expected self-interference-based errors in the respective first data frame, in accordance with the presently disclosed subject matter.

In accordance with the presently disclosed subject matter, in some cases, radio transceiver 200 can be configured, e.g., using ECC capability estimation module 260, to estimate a capability of an ECC of a respective first data frame to correct expected self-interference-based errors in the respective first data frame before the multi-channel receiver 210 receives the respective first data frame.

To achieve this, before the multi-channel receiver 210 receives the respective first data frame (i.e., prior to the first time slots of the common time period), radio transceiver 200 can be configured to obtain, for the respective first data frame, the first frequency channel over which the first data slots of the respective first data frame are to be received (block 604).

In addition, radio transceiver 200 can be configured, prior to the multi-channel transmitter 220 transmitting the second data frames (i.e., prior to the first time slots of the common time period), to obtain, for each second data frame of the second data frames, the second frequency channel over which the second data slots of the respective second data frame are to be transmitted (block 608).

Radio transceiver 200 can be configured, e.g., using ECC capability estimation module 260, to determine, for at least some of the first time slots, a given difference in frequency between the first frequency channel over which a respective first data slot of the respective first data frame is to be received during the respective first time slot and at least one (and preferably all) respective second frequency channel over which a respective second data slot of a corresponding second data frame of the second data frames is to be transmitted during the respective first time slot, wherein a determination that the given difference is less than the first difference is indicative of at least one expected self-interference-based error in the respective first data slot of the respective first data frame (block 612).

Radio transceiver 200 can be further configured, e.g., using ECC capability estimation module 260, to estimate a capability of the ECC of the respective first data frame to correct the expected self-interference-based error, if any, wherein the ECC is estimated to be capable of correcting the expected self-interference-based error when a number of the first data slots of the respective first data frame that are expected to include one or more expected self-interference-based errors is less than or equal to a predefined number (block 616).

In some cases, radio transceiver 200 can be configured, e.g., using digital controller 230, to determine the predefined number in accordance with one or more of the following: (a) a code rate of the ECC; (b) a type of the ECC (e.g., a Convolutional-Turbo-Code (CTC)); (c) an expected signal-to-noise ratio (SNR) for the respective first data frame; or (d) an expected effect of radio-frequency interference that is external to the radio transceiver 200 on the multi-channel receiver 210.

In some cases, the expected SNR for the respective first data frame can be estimated based on a measured SNR of data transmissions received by the multi-channel receiver 210 prior to the first time slots.

In some cases, upon estimating that the ECC is not capable of correcting the expected self-interference-based-error, radio transceiver 200 can be configured, e.g., using digital controller 230, to skip a transmission of the respective second data slot, thereby avoiding the expected self-interference-based error in the respective first data slot of the respective first data frame. By skipping the transmission of the respective second data slot, and consequently reducing self-interference-based errors in the respective first data frame, the successful decoding of the respective first data frame depends especially on a condition of the first frequency channels over which the first data slots of the respective first data frame are received. As such, radio transceiver 200 can better support services that require a high degree of certainty that the transmitted data will be successfully received, e.g. services that require a high data rate (video, etc.) or that include real-time big data. It is to be noted that, by skipping the transmission of the respective second data slot, the amount of information that is transmitted in the corresponding second data frame is reduced by the amount of information that was to have been transmitted during the respective second data slot.

In some cases, radio transceiver 200 can be further configured, e.g., using digital controller 230, to modify a transmission of the corresponding second data frame (that includes the respective second data slot for which the transmission is to be skipped) to indicate that the transmission of the respective second data slot has been skipped.

Returning to FIG. 2, in some cases, multi-channel receiver 210 can be configured to include a reception filter bank 270. Reception filter bank 270, which is described in detail further herein, inter alia with reference to FIGS. 7, 8, 11 and 12, can be configured to process (i.e., pass) the first data frames in the input radio signal that is received by the multi-channel receiver 210 while filtering out components in the input radio signal resulting from interfering radio signals, including, inter alia, self-interfering radio signals resulting from the transmission of second data frames concurrently to the reception of the input radio signal, as detailed further herein, inter alia with reference to FIGS. 7 and 8.

In some cases, multi-channel receiver 210 can be further configured to include a self-interference compensation unit 280. Self-interference compensation unit 280 can be configured to compensate for at least some of the interfering radio signals that are present in an input radio signal and not filtered out by the reception filter bank 270, as detailed further herein, inter alia with reference to FIGS. 15 to 17.

In some cases, multi-channel transmitter 220 can be configured to include a transmission filter bank 290. Transmission filter bank 290, which is described in detail further herein, inter alia with reference to FIGS. 9, 10, 13 and 14, can be configured to process (i.e., pass) the second data frames that are to be transmitted by multi-channel transmitter 220.

By including a reception filter bank 270 and a transmission filter bank 290, radio transceiver 200 can be configured to have a full-duplex link. In order for the radio transceiver 200 to have a full-duplex link, the first data frequencies over which the first data frames are received at any given time must be different from the second data frequencies over which the second data frames are transmitted at the given time. In some cases, this can be enabled by the reception filter bank 270 and the transmission filter bank 290, which each divide the common frequency band into distinct frequency channels that cover the common frequency band, thereby enabling the first data frames to be received over first frequency channels, of the distinct frequency channels, during each respective first time slot of the first time slots, and the second data frames to be transmitted over second frequency channels, of the distinct frequency channels, that are different than the first frequency channels during each corresponding respective first time slot of the first time slots. If the difference in frequency between a first frequency channel over which a respective first data slot of a respective first data frame is received during a respective first time slot and each of the second frequency channels over which respective second data slots of the second data frames are transmitted during the respective first time slot is greater than or equal to a first difference, the effect of self-interference on the respective first data frame will be minor, such that no self-interference-based errors are to be expected in the respective first data slot.

Figure 7:
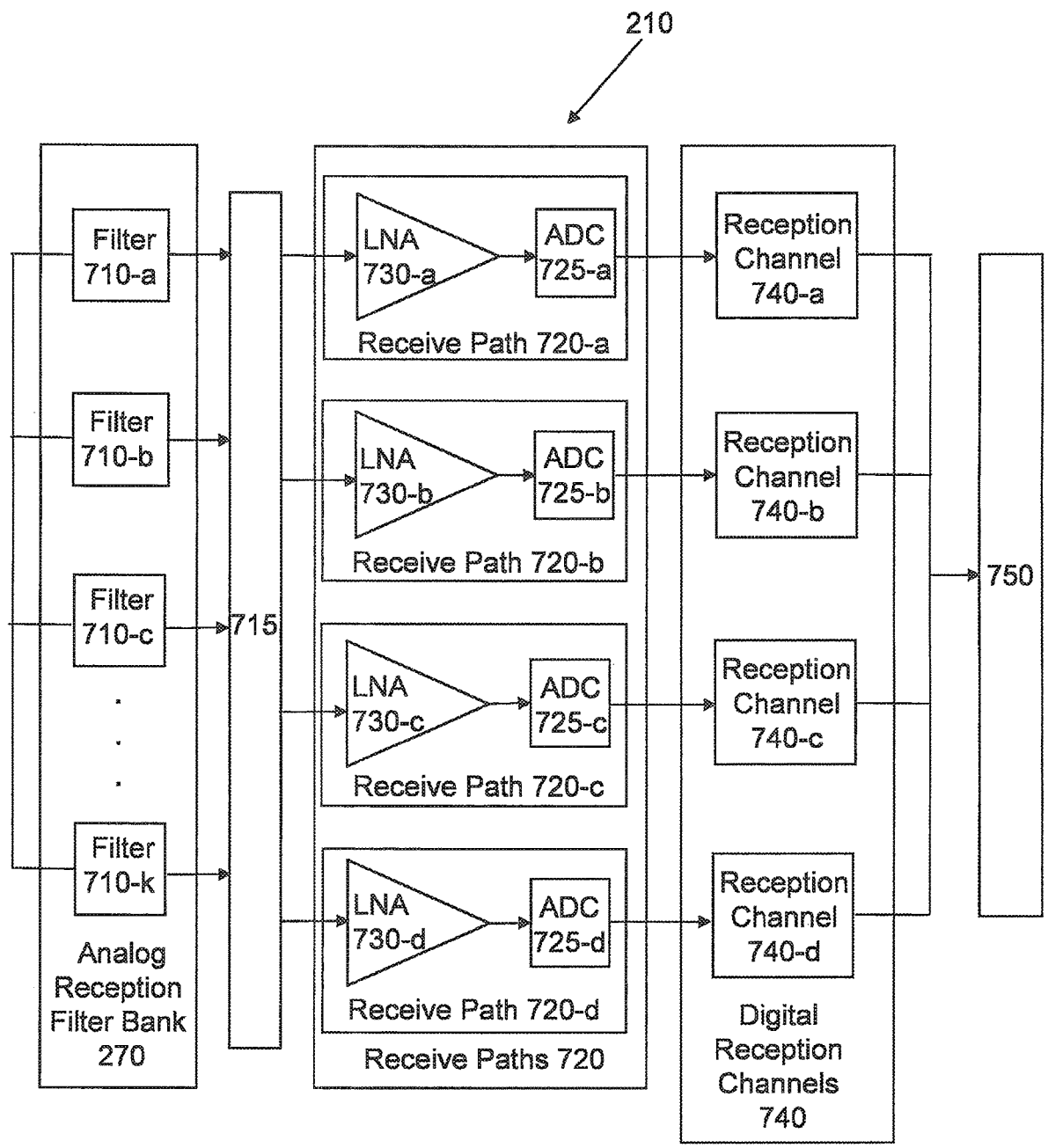
FIG. 7 is a block diagram schematically illustrating a first example of a multi-channel receiver, in accordance with the presently disclosed subject matter.

Attention is now drawn to FIG. 7, a block diagram schematically illustrating a first example of a multi-channel receiver 210, in accordance with the presently disclosed subject matter.

In accordance with the presently disclosed subject matter, in some cases, multi-channel receiver 210 can be configured to include an analog reception filter bank 270, a plurality of receive paths 720 (e.g., receive paths 720-a, 720-b, 720-c, 720-d), a plurality of digital reception channels 740 (e.g., reception channels 740-a, 740-b, 740-c, 740-d), and a demodulator 750.

Analog reception filter bank 270 can be coupled to the at least one receiver antenna 235 (shown in FIG. 2), and can be configured to receive: (a) the input radio signal or (b) a filtered input radio signal that includes components of the input radio signal that are within the common frequency band. Analog reception filter bank 270 can be configured to include a plurality of analog first filters (e.g., 710-*a*, 710-*b*, 710-*c*, . . . , 710-*k*), each analog first filter of the analog first filters (e.g., 710-*a*, 710-*b*, 710-*c*, . . . , 710-*k*) being associated with a respective distinct frequency channel of the distinct frequency channels that cover the common frequency band. Analog reception filter bank 270 can be configured to process (i.e., pass) the first data frames that are received by the multi-channel receiver 210 based on the first frequency channels thereof, which, as noted earlier herein, inter alia with reference to FIG. 2, are of the distinct frequency channels, while filtering out components in the input radio signal resulting from interfering radio signals, including, inter alia, self-interference components (defined earlier herein, inter alia with reference to FIG. 2). In some cases, one or more of the analog first filters (e.g., 710-*a*, 710-*b*, 710-*c*, . . . , 710-*k*) can be analog first bandpass filters that are associated with one or more of the distinct frequency channels. Additionally, or alternatively, in some cases, one or more of the analog first filters (e.g., 710-*a*, 710-*b*, 710-*c*, . . . , 710-*k*) can be analog first notch filters that are associated with one or more of the distinct frequency channels.

A plurality of receive paths 720 can be coupled to an output of analog reception filter bank 270. Each receive path (e.g., 720-*a*, 720-*b*, 720-*c*, 720-*d*) of the receive paths 720 can be configured to include an analog-to-digital converter (ADC) (e.g., 725-*a*, 725-*b*, 725-*c*, 725-*d*). The ADC's in the receive paths 720 can be configured to digitize the first data frames. Moreover, in some cases, each receive path (e.g., 720-*a*, 720-*b*, 720-*c*, 720-*d*) of the receive paths 720 can be configured to include at least one amplification circuit. In some cases, the amplification circuit can be configured to include a low-noise amplifier (LNA) (e.g., 730-*a*, 730-*b*, 730-*c*, 730-*d*), as illustrated in FIG. 7.

In some cases (not as illustrated in FIG. 7), a number of the receive paths 720 that are coupled to the output of analog reception filter bank 270 can correspond to the number of first filters in analog reception filter bank 270, such that, at any given time, each respective first data frame is digitized by a different ADC of the ADC's. Alternatively, in some cases, as illustrated in FIG. 7, the number of receive paths 720 (e.g., 720-*a*, 720-*b*, 720-*c*, 720-*d*) that are coupled to the output of analog reception filter bank 270 can be less than the number of first filters (e.g., 710-*a*, 710-*b*, 710-*c*, . . . , 710-*k*) in analog reception filter bank 270. In such cases, as illustrated in FIG. 7, an analog/radio-frequency (RF) reception switch matrix 715 can be coupled between analog reception filter bank 270 and receive paths 720 to route the outputs of analog reception filter bank 270 to the appropriate receive paths 720, in accordance with the frequencies of the first data frames to be processed.

A plurality of digital reception channels 740 can be coupled to an output of the receive paths 720, and configured to process the first data frames. Each digital reception channel (e.g., 740-*a*, 740-*b*, 740-*c*, 740-*d*) of the digital reception channels 740 can process an output of a distinct ADC (e.g., 725-*a*, 725-*b*, 725-*c*, 725-*d*) of the ADC's.

Demodulator 750 can be configured to demodulate the first data frames.

Figure 8:
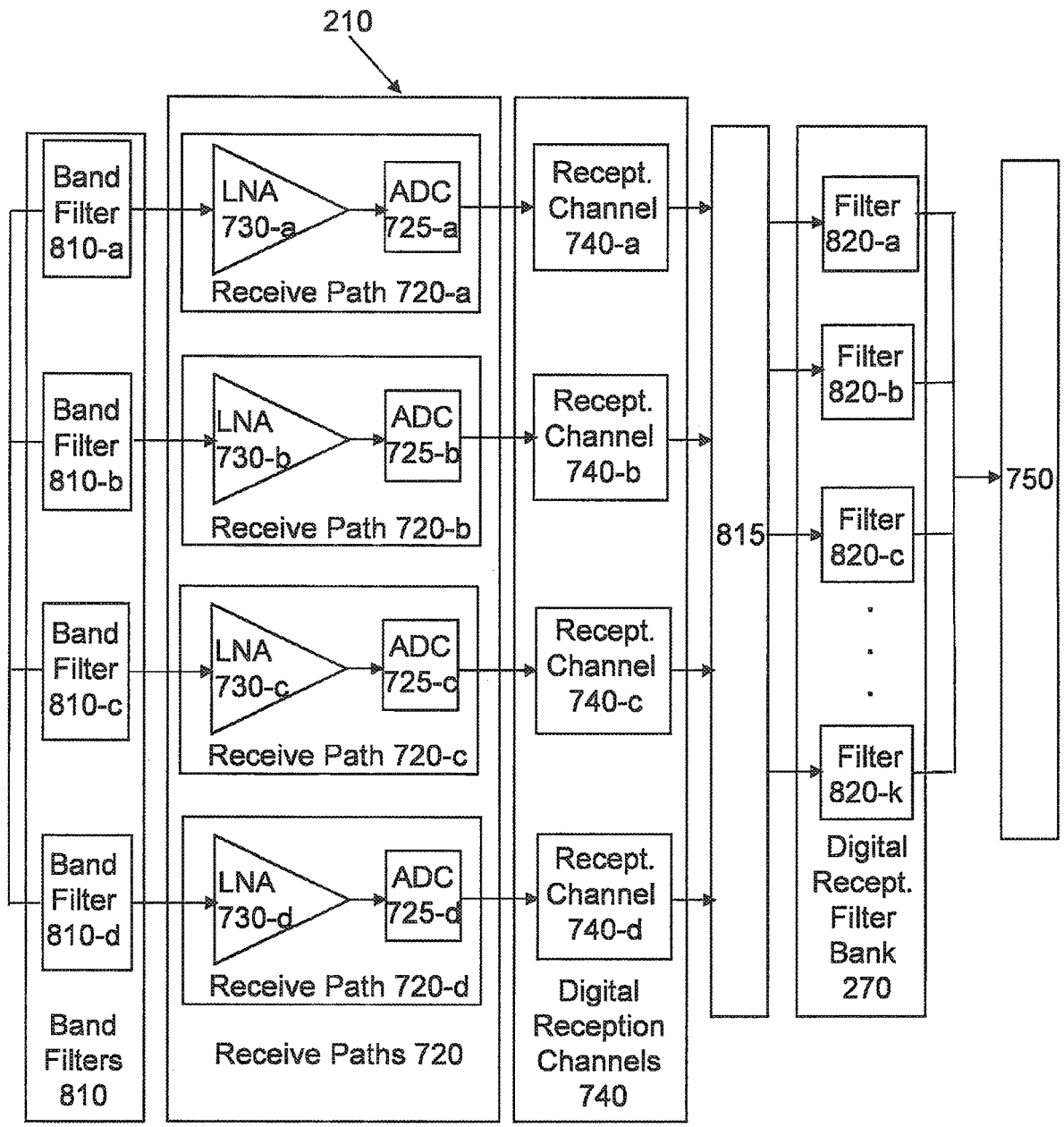
FIG. 8 is a block diagram schematically illustrating a second example of a multi-channel receiver, in accordance with the presently disclosed subject matter.

Attention is now drawn to FIG. 8, a block diagram schematically illustrating a second example of a multi-channel receiver 210, in accordance with the presently disclosed subject matter.

In accordance with the presently disclosed subject matter, in some cases, multi-channel receiver 210 can be configured to include one or more radio-frequency (RF) band filters 810 (e.g., 810-*a*, 810-*b*, 810-*c*, 810-*d*), one or more receive paths 720 (e.g., 720-*a*, 720-*b*, 720-*c*, 720-*d*), one or more digital reception channels 740 (e.g., reception channels 740-*a*, 740-*b*, 740-*c*, 740-*d*), a digital reception filter bank 270, and a demodulator 750.

In some cases (not as illustrated in FIG. 8), a single band filter 810 can be coupled to the at least one receiver antenna 235 (shown in FIG. 2). The band filter 810 can be configured to receive the input radio signal, and to output components of the input radio signal that are within the common frequency band.

A single receive path 720 can be coupled to the band filter 810. The single receive path 720 can be configured to include a single wideband ADC 725 that digitizes all of the first data frames. Moreover, in some cases, the single receive path 720 can be configured to include at least one amplification circuit. In some cases, the amplification circuit can be configured to include a low-noise amplifier (LNA) 730.

A single digital reception channel 740 can be coupled to an output of the single receive path 720, and configured to process the digitized radio signals that are output by the single receive path 720.

Digital reception filter bank 270 can be coupled to an output of the single digital reception channel 740 to split the digitized radio signals into distinct frequency channels that cover the common frequency band. Digital reception filter bank 270 can be configured to include a plurality of digital first filters (e.g., 820-*a*, 820-*b*, 820-*c*, . . . , 820-*k*), each digital first filter of the digital first filters (e.g., 820-*a*, 820-*b*, 820-*c*, . . . , 820-*k*) being associated with a respective distinct frequency channel of the distinct frequency channels that cover the common frequency band. Digital reception filter bank 270 can be configured to process (i.e., pass) the first data frames based on the first frequency channels thereof, which, as noted earlier herein, inter alia with reference to FIG. 2, are of the distinct frequency channels, while filtering out components in the digitized radio signals resulting from interfering radio signals, including, inter alia, self-interference components (defined earlier herein, inter alia with reference to FIG. 2). In some cases, one or more of the digital first filters (e.g., 820-*a*, 820-*b*, 820-*c*, . . . , 820-*k*) can be digital first bandpass filters that are associated with one or more of the distinct frequency channels. Additionally, or alternatively, in some cases, one or more of the digital first filters (e.g., 820-*a*, 820-*b*, 820-*c*, . . . , 820-*k*) can be digital first notch filters that are associated with one or more of the distinct frequency channels.

In some cases, as illustrated in FIG. 8, a plurality of band filters 810 (e.g., 810-*a*, 810-*b*, 810-*c*, 810-*d*) can be coupled to the at least one receiver antenna 235 (shown in FIG. 2). The band filters 810 can be configured to receive the input radio signals (e.g., via a RF front end). Each band filter (e.g., 810-*a*, 810-*b*, 810-*c*, 810-*d*) of the band filters 810 can be configured to process (i.e., pass) the input radio signals that are received by multi-channel receiver 210 within a distinct sub-band of the common frequency band, the distinct sub-band including a plurality of distinct frequency channels.

A plurality of receive paths 720 (e.g., 720-*a*, 720-*b*, 720-*c*, 720-*d*) can be coupled to an output of the band filters 810. Each receive path (e.g., 720-*a*, 720-*b*, 720-*c*, 720-*d*) of the receive paths 720 can be coupled to an output of a respective band filter (e.g., 810-*a*, 810-*b*, 810-*c*, 810-*d*) of the band filters 810. Each receive path (e.g., 720-*a*, 720-*b*, 720-*c*, 720-*d*) of the receive paths 720 can be configured to include a respective ADC (e.g., 725-*a*, 725-*b*, 725-*c*, 725-*d*) that digitizes the first data frames that are output by the respective band filter (e.g., 810-*a*, 810-*b*, 810-*c*, 810-*d*) to which it is coupled. Moreover, in some cases, each receive path (e.g.,

720-*a*, 720-*b*, 720-*c*, 720-*d*) can be configured to include at least one amplification circuit. In some cases, the amplification circuit can be configured to include a low-noise amplifier (LNA) (e.g., 730-*a*, 730-*b*, 730-*c*, 730-*d*) that precedes the respective ADC (e.g., 725-*a*, 725-*b*, 725-*c*, 725-*d*) in the respective receive path (e.g., 720-*a*, 720-*b*, 720-*c*, 720-*d*).

A plurality of digital reception channels 740 can be coupled to an output of the receive paths 720. Each digital reception channel (e.g., 740-*a*, 740-*b*, 740-*c*, 740-*d*) of the digital reception channels 740 can be coupled to an output of a respective receive path (e.g., 720-*a*, 720-*b*, 720-*c*, 720-*d*) of the receive paths 720, and configured to process the digitized radio signals that are output by the respective receive path (e.g., 720-*a*, 720-*b*, 720-*c*, 720-*d*).

In some cases, multi-channel receiver 210 can be configured to include a digital reception channel switch matrix 815 that routes the outputs of the respective digital reception channels 740 to appropriate digital first filters (e.g., 820-*a*, 820-*b*, 820-*c*, . . . , 820-*k*) in digital reception filter bank 270, the digital reception filter bank 270 being described earlier herein. The digital first filters (e.g., 820-*a*, 820-*b*, 820-*c*, . . . , 820-*k*) can be configured to process (i.e., pass) the first data frames that are output by the digital reception channels 740 based on the first frequency channels thereof, while filtering out components in the digitized radio signals output by the digital reception channels 740 that result from interfering radio signals, including, inter alia, self-interference components (defined earlier herein, inter alia with reference to FIG. 2).

Demodulator 750 can be coupled to an output of the digital reception filter bank 270, and configured to demodulate the first data frames that are processed by the digital reception filter bank 270.

In some cases (not as illustrated in FIGS. 7 and 8), multi-channel receiver 210 can be configured to not include an analog reception filter bank 270 or a digital reception filter bank 270. Rather, multi-channel receiver 210 can be configured to include a single receive path 720, a single digital reception channel 740, and a plurality of digital filters that are coupled to an output of the single digital reception channel 740, wherein each digital filter of the digital filters can be configured to process a respective plurality of distinct frequency channels within the common frequency band. In this case, the full-duplex link can still be achieved by including self-interference compensation unit 280 in the multi-channel receiver 210.

Figure 9:
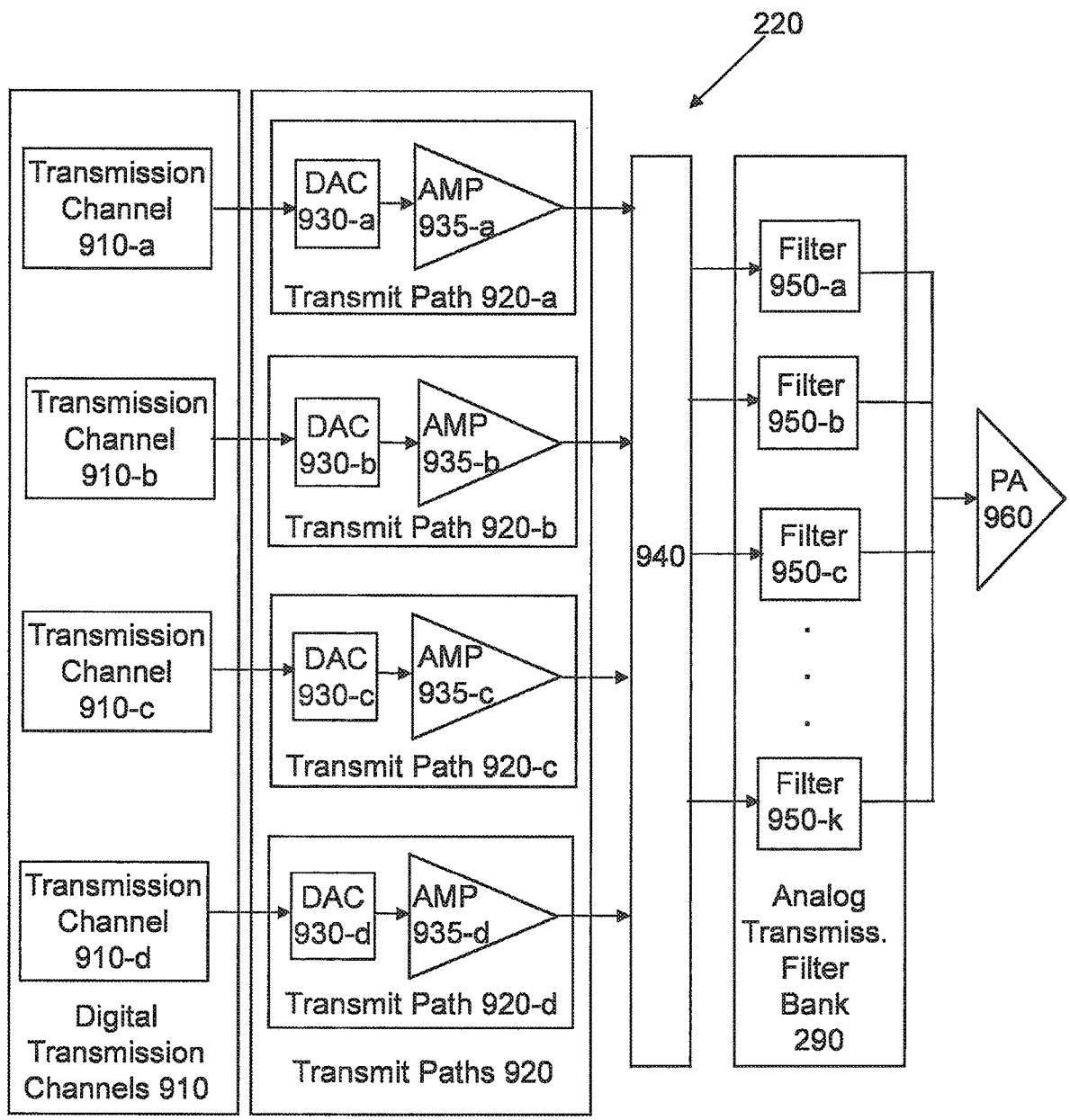
FIG. 9 is a block diagram schematically illustrating a first example of a multi-channel transmitter, in accordance with the presently disclosed subject matter.

Attention is now drawn to FIG. 9, a block diagram schematically illustrating a first example of a multi-channel transmitter 220, in accordance with the presently disclosed subject matter.

In accordance with the presently disclosed subject matter, in some cases, multi-channel transmitter 220 can be configured to include one or more digital transmission channels 910 (e.g., transmission channels 910-*a*, 910-*b*, 910-*c*, 910-*d*), one or more transmit paths 920 (e.g., transmit paths 920-*a*, 920-*b*, 920-*c*, 920-*d*), and analog transmission filter bank 290.

Digital transmission channels 910 can be configured to modulate the second data frames for a transmission thereof over second frequency channels of the distinct frequency channels covering the common frequency band. Each digital transmission channel (e.g., 910-*a*, 910-*b*, 910-*c*, 910-*d*) of the digital transmission channels 910 can be configured, at any given time, to modulate a respective second data frame of the second data frames to be transmitted.

In some cases, as illustrated in FIG. 9, transmit paths 920 can be coupled to an output of the digital transmission channels 910. Moreover, in some cases, as illustrated in FIG. 9, each transmit path (e.g., 920-*a*, 920-*b*, 920-*c*, 920-*d*) of the transmit paths 920 can be coupled to an output of a distinct digital transmission channel (e.g., 910-*a*, 910-*b*, 910-*c*, 910-*d*) of the digital transmission channels 910. Alternatively, in some cases (not as illustrated in FIG. 9), each transmit path (e.g., 920-*a*, 920-*b*, 920-*c*, 920-*d*) of the transmit paths 920 can be coupled to an output of a plurality of digital transmission channels 910, via, for example, a digital transmission channel switch matrix (not shown) that routes each of the second data frames that are output by the digital transmission channels 910 to an appropriate transmit path (e.g., 920-*a*, 920-*b*, 920-*c*, 920-*d*) of the transmit paths 920. As a further alternative, in some cases (not as illustrated in FIG. 9), a single transmit path 920 can be coupled to an output of one or more digital transmission channels 910.

Each transmit path (e.g., 920-*a*, 920-*b*, 920-*c*, 920-*d*) of the transmit paths 920 can be configured to include a digital-to-analog converter (DAC) (e.g., 930-*a*, 930-*b*, 930-*c*, 930-*d*). The DAC's in the transmit paths 920 can be configured to reconstruct the second data frames (i.e., convert the digital second data frames that are output by the digital transmission channels 910 to analog second data frames). In some cases, each transmit path (e.g., 920-*a*, 920-*b*, 920-*c*, 920-*d*) of the transmit paths 920 can also be configured to include at least one respective amplification circuit (e.g., 935-*a*, 935-*b*, 935-*c*, 935-*d*). In some cases, the respective amplification circuit (e.g., 935-*a*, 935-*b*, 935-*c*, 935-*d*) can follow its corresponding DAC (e.g., 930-*a*, 930-*b*, 930-*c*, 930-*d*), as illustrated in FIG. 9.

Analog transmission filter bank 290 can be configured to include a plurality of analog second filters (e.g., 950-*a*, 950-*b*, 950-*c*, . . . , 950-*k*), each analog second filter of the analog second filters (e.g., 950-*a*, 950-*b*, 950-*c*, . . . , 950-*k*) being associated with a respective distinct frequency channel of the distinct frequency channels that cover the common frequency band. Analog transmission filter bank 290 can be configured to process (i.e., pass) the second data frames that are to be transmitted by multi-channel transmitter 220 based on the second frequency channels thereof, which, as noted earlier herein, inter alia with reference to FIG. 2, are of the distinct frequency channels. In some cases, one or more of the analog second filters can be analog second bandpass filters that are associated with one or more of the distinct frequency channels. Additionally, or alternatively, in some cases, one or more of the analog second filters can be analog second notch filters that are associated with one or more of the distinct frequency channels.

In some cases (not as illustrated in FIG. 9), a number of the transmit paths 920 can correspond to a number of the second filters (e.g., 950-*a*, 950-*b*, 950-*c*, . . . , 950-*k*) in analog transmission filter bank 290, such that, at any given time, each respective second data frame is reconstructed by a different DAC of the DAC's. Alternatively, in some cases, as illustrated in FIG. 9, the number of transmit paths 920 can be one or more, and less than the number of second filters (e.g., 950-*a*, 950-*b*, 950-*c*, . . . , 950-*k*) in analog transmission filter bank 290. In some such cases, in which there are a plurality of transmit paths 920 that are less than the number of second filters (e.g., 950-*a*, 950-*b*, 950-*c*, . . . , 950-*k*), an analog/RF transmission switch matrix 940 can be configured to route the outputs of the transmit paths 920 to the appropriate second filters (e.g., 950-*a*, 950-*b*, 950-*c*, . . . , 950-*k*) for further processing.

In some cases, as illustrated in FIG. 9, multi-channel transmitter 220 can be configured to include a power amplifier (PA) 960 that is coupled to the at least one transmitter antenna 240 (shown in FIG. 2). PA 960 can be configured to amplify the second data frames prior to the transmission thereof. Alternatively, in some cases, multi-channel transmitter 220 can be configured to not include a PA 960, such that the at least one transmitter antenna 240 is coupled directly to the analog transmission filter bank 290. In such cases, all of the transmission power can be achieved by the power amplifiers AMPs (e.g., 935-a, 935-b, 935-c, 935-d) in the transmit paths 920. This configuration can achieve less interference between the second frequency channels of the second data frames, due to the filtering of the second frequency channels following all of the amplification of the second data frames.

Figure 10:
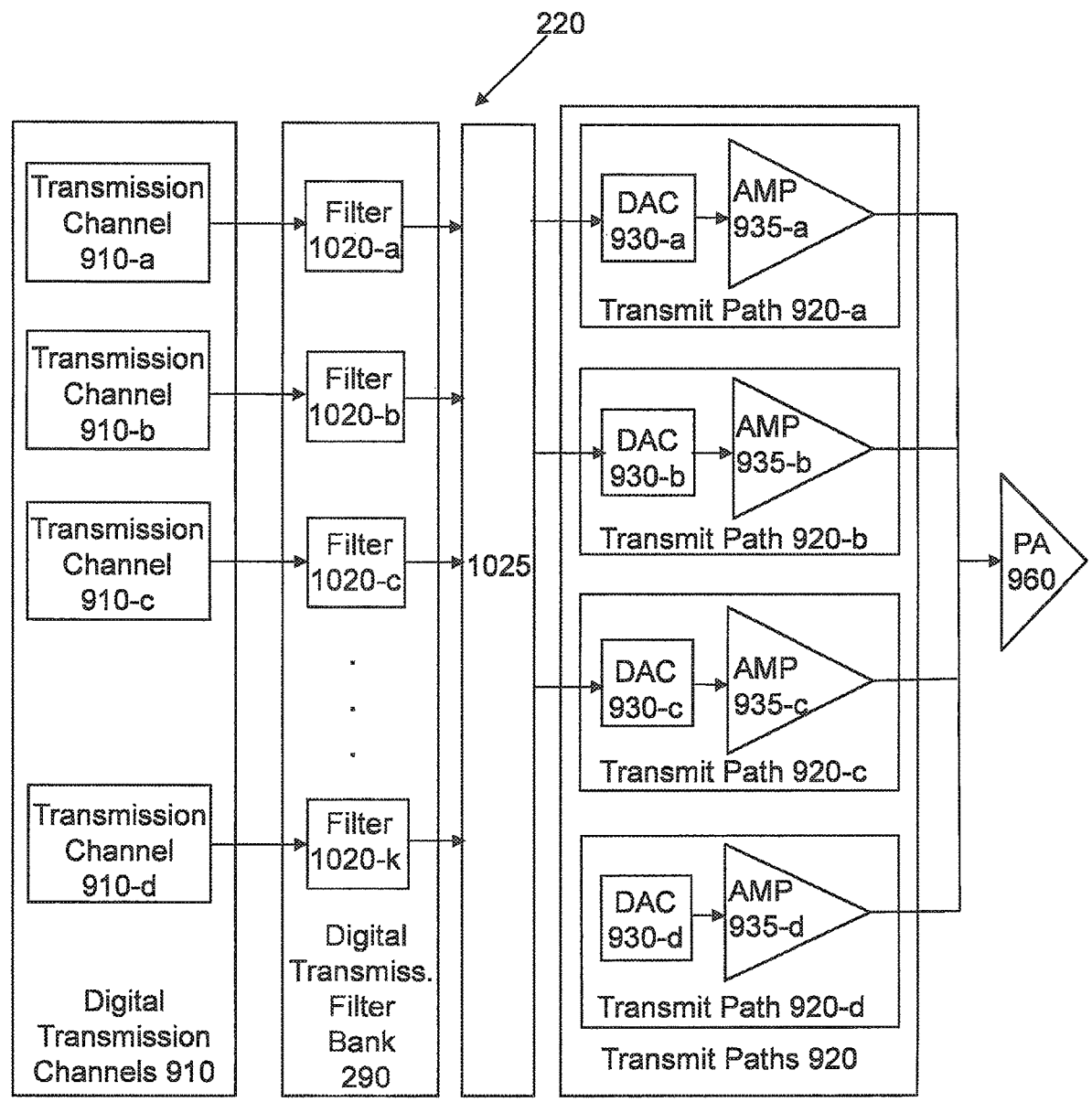
FIG. 10 is a block diagram schematically illustrating a second example of a multi-channel transmitter, in accordance with the presently disclosed subject matter.

Attention is now drawn to FIG. 10, a block diagram schematically illustrating a second example of a multi-channel transmitter 220, in accordance with the presently disclosed subject matter.

In accordance with the presently disclosed subject matter, in some cases, multi-channel transmitter 220 can be configured to include one or more digital transmission channels 910 (e.g., 910-a, 910-b, 910-c, 910-d), a digital transmission filter bank 290, and one or more transmit paths 920 (e.g., 920-a, 920-b, 920-c, 920-d).

Digital transmission channels 910 can be configured to modulate the second data frames for a transmission thereof over second frequency channels of the distinct frequency channels covering the common frequency band. Each digital transmission channel (e.g., 910-a, 910-b, 910-c, 910-d) of the digital transmission channels 910 can be configured, at any given time, to modulate a respective second data frame of the second data frames to be transmitted.

In some cases, as illustrated in FIG. 10, digital transmission filter bank 290 can be integrated with the digital transmission channels 910. Digital transmission filter bank 290 can be configured to include a plurality of digital second filters (e.g., 1020-a, 1020-b, 1020-c, . . . , 1020-k), each digital second filter of the digital second filters (e.g., 1020-a, 1020-b, 1020-c, . . . , 1020-k) being associated with a respective distinct frequency channel of the distinct frequency channels that cover the common frequency band. Digital transmission filter bank 290 can be configured to process (i.e., pass) the second data frames that are to be transmitted by multi-channel transmitter 220 based on the second frequency channels thereof, which, as noted earlier herein, inter alia with reference to FIG. 2, are of the distinct frequency channels. Specifically, an output of each respective transmission channel (e.g., 910-a, 910-b, 910-c, 910-d) can be routed to an appropriate digital second filter(s) of the digital second filters (e.g., 1020-a, 1020-b, 1020-c, . . . , 1020-k) to process the second data frames that are to be transmitted.

In some cases, one or more of the digital second filters (e.g., 1020-a, 1020-b, 1020-c, . . . , 1020-k) can be digital second bandpass filters that are associated with one or more of the distinct frequency channels. Additionally, or alternatively, in some cases, one or more of the digital second filters (e.g., 1020-a, 1020-b, 1020-c, . . . , 1020-k) can be digital second notch filters that are associated with one or more of the distinct frequency channels.

In some cases (not as illustrated in FIGS. 9 and 10), multi-channel transmitter 220 can be configured to not include an analog transmission filter bank 290 or a digital transmission filter bank 290. Rather, multi-channel transmitter 220 can be configured to include a plurality of digital filters that are integrated with the digital transmission channels 910, a respective digital filter of the digital filters being capable of processing a plurality of second data frames that are output by the digital transmission channels 910. In this case, the full-duplex link can still be achieved by including self-interference compensation unit 280 in the multi-channel receiver 210.

In some cases, as illustrated in FIG. 10, transmit paths 920 can be coupled to an output of the digital transmission filter bank 290 or to an output of the digital filters. Each transmit path (e.g., 920-a, 920-b, 920-c, 920-d) of the transmit paths 920 can be configured to include a digital-to-analog converter (DAC) (e.g., 930-a, 930-b, 930-c, 930-d). The DAC's in the transmit paths 920 can be configured to reconstruct the second data frames (i.e., convert the digital second data frames that are output by the digital transmission filter bank 290 (or digital filters) to analog second data frames). In some cases, each transmit path (e.g., 920-a, 920-b, 920-c, 920-d) of the transmit paths 920 can also be configured to include at least one respective amplification circuit (e.g., 935-a, 935-b, 935-c, 935-d). In some cases, the respective amplification circuit (e.g., 935-a, 935-b, 935-c, 935-d) can follow its corresponding DAC (e.g., 930-a, 930-b, 930-c, 930-d), as illustrated in FIG. 10.

In some cases, as illustrated in FIG. 10, multi-channel transmitter 220 can be configured to include a plurality of transmit paths 920 that are less than a number of second digital filters (e.g., 1020-a, 1020-b, 1020-c, . . . , 1020-k). In such cases, multi-channel transmitter 220 can be configured to include a digital transmission switch matrix 1025 that is configured to route the outputs of the second digital filters (e.g., 1020-a, 1020-b, 1020-c, . . . , 1020-k) to the appropriate transmit paths 920.

In some cases (not as illustrated in FIG. 10), multi-channel transmitter 220 can be configured to include a single transmit path 920, in which case the transmit path 920 can be directly coupled to an output of digital transmission filter bank 290 (or digital filters), i.e. not via a digital transmission switch matrix 1025.

In some cases, as illustrated in FIG. 10, multi-channel transmitter 220 can be configured to include a power amplifier (PA) 960 that is coupled to the at least one transmitter antenna 240 (shown in FIG. 2). PA 960 can be configured to amplify the second data frames prior to the transmission thereof. Alternatively, in some cases, multi-channel transmitter 220 can be configured to not include a PA 960, such that the at least one transmitter antenna 240 is coupled directly to the transmit paths 920. In such cases, all of the transmission power can be achieved by the power amplifiers AMPs (e.g., 935-a, 935-b, 935-c, 935-d) in the transmit paths 920.

Figure 11:
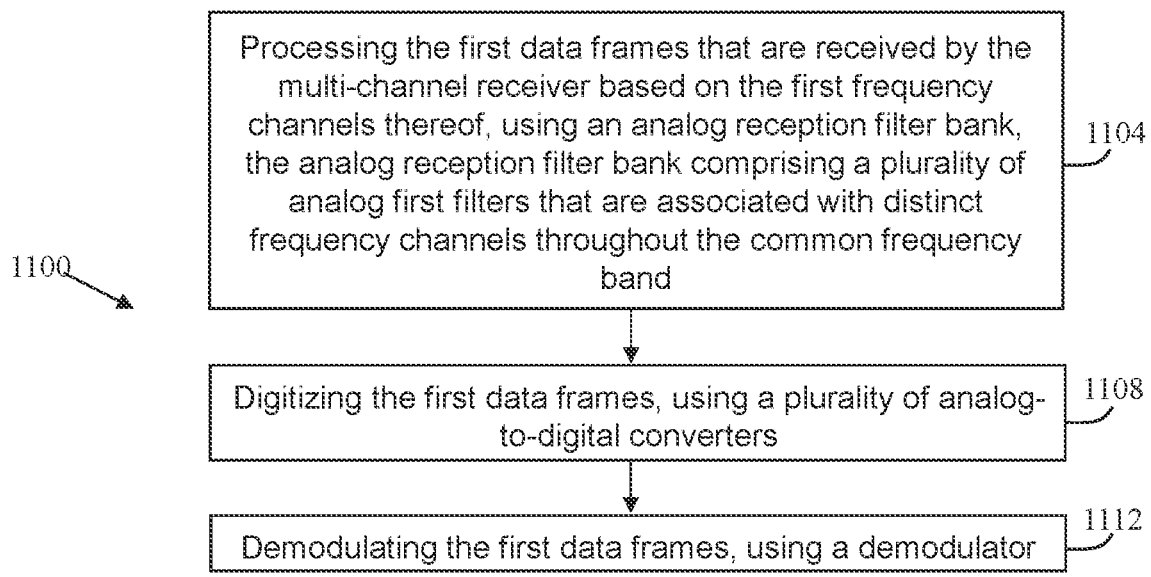
FIG. 11 is a flowchart illustrating a first example of a sequence of operations performed by the multi-channel receiver, in accordance with the presently disclosed subject matter.

Attention is now drawn to FIG. 11, a flowchart illustrating a first example of a sequence of operations 1100 performed by multi-channel receiver 210, in accordance with the presently disclosed subject matter.

In accordance with the presently disclosed subject matter, in some cases, multi-channel receiver 210 can be configured, using analog reception filter bank 270, to process the first data frames that are received by the multi-channel receiver 210 based on the first frequency channels thereof, the analog reception filter bank 270 comprising a plurality of analog first filters (e.g., 710-a, 710-b, 710-c, . . . , 710-k) that are associated with distinct frequency channels throughout the common frequency band (block 1104). In some cases, one or more of the analog first filters (e.g., 710-a, 710-b, 710-c, . . . , 710-k) can be analog first bandpass filters. Additionally, or alternatively, in some cases, one or more of the analog first filters (e.g., 710-*a*, 710-*b*, 710-*c*, . . . , 710-*k*) can be analog first notch filters.

Multi-channel receiver 210 can be further configured, using a plurality of analog-to-digital converters (e.g., 725-*a*, 725-*b*, 725-*c*, . . . 725-*d*), to digitize the first data frames (block 1108).

Multi-channel receiver 210 can be further configured, using a demodulator 750, to demodulate the first data frames (block 1112).

Figure 12:
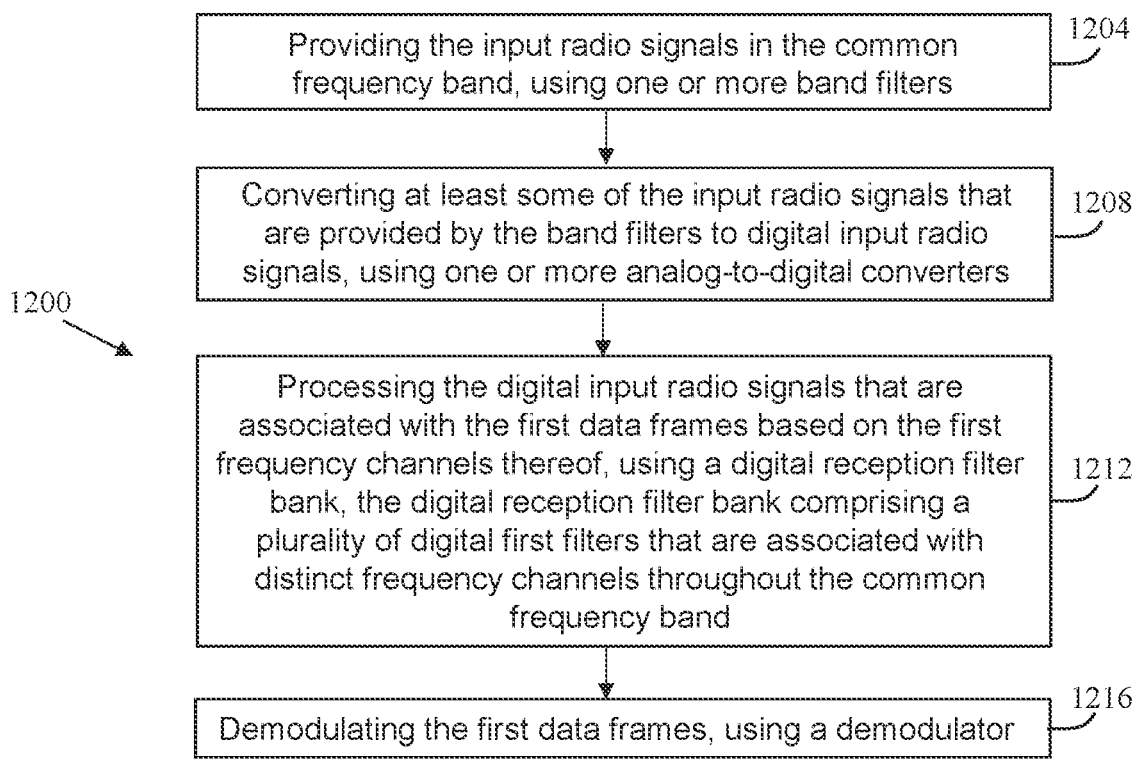
FIG. 12 is a flowchart illustrating a second example of a sequence of operations performed by the multi-channel receiver, in accordance with the presently disclosed subject matter.

Attention is now drawn to FIG. 12, a flowchart illustrating a second example of a sequence of operations 1200 performed by multi-channel receiver 210, in accordance with the presently disclosed subject matter.

In accordance with the presently disclosed subject matter, in some cases, multi-channel receiver 210 can be configured, using one or more band filters 810, to provide (i.e., pass) the input radio signals in the common frequency band (block 1204). In some cases, multi-channel receiver 210 can be configured to include a plurality of band filters 810, each band filter (e.g., 810-*a*, 810-*b*, 810-*c*, 810-*d*) of the band filters 810 providing (i.e., passing) the input radio signals that are in a distinct sub-band of the common frequency band.

Multi-channel receiver 210 can be further configured, using one or more analog-to-digital converters (e.g., 725-*a*, 725-*b*, 725-*c*, 725-*d*), to convert at least some of the input radio signals that are provided by the band filters 810 to digital input radio signals (block 1208).

Moreover, multi-channel receiver 210 can be configured, using digital reception filter bank 270, to process the digital input radio signals that are associated with the first data frames based on the first frequency channels thereof, the digital reception filter bank 270 comprising a plurality of digital first filters (e.g., 820-*a*, 820-*b*, 820-*c*, . . . , 820-*k*) that are associated with distinct frequency channels throughout the common frequency band (block 1212). In some cases, one or more of the digital first filters (e.g., 820-*a*, 820-*b*, 820-*c*, . . . , 820-*k*) can be digital first bandpass filters. Additionally, or alternatively, in some cases, one or more of the digital first filters (e.g., 820-*a*, 820-*b*, 820-*c*, . . . , 820-*k*) can be digital first notch filters.

Multi-channel receiver 210 can further be configured, using a demodulator 750, to demodulate the first data frames (block 1216).

Figure 13:
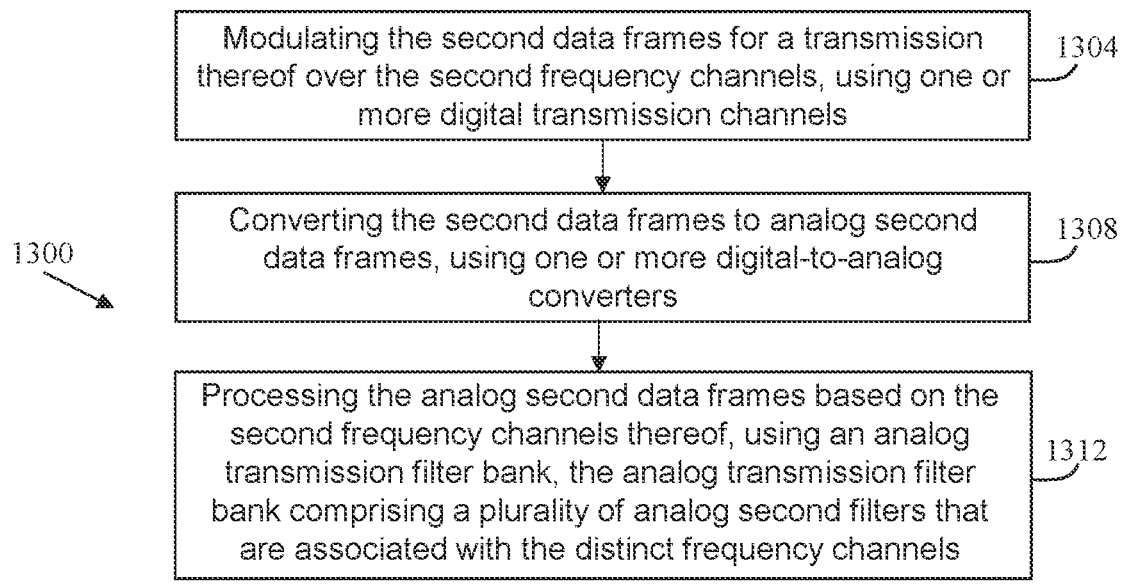
FIG. 13 is a flowchart illustrating a first example of a sequence of operations performed by the multi-channel transmitter, in accordance with the presently disclosed subject matter.

Attention is now drawn to FIG. 13, a flowchart illustrating a first example of a sequence of operations performed by multi-channel transmitter 220, in accordance with the presently disclosed subject matter.

In accordance with the presently disclosed subject matter, multi-channel transmitter 220 can be configured, using one or more digital transmission channels 910, to modulate the second data frames for a transmission thereof over the second frequency channels (block 1304).

Multi-channel transmitter 220 can also be configured, using one or more digital-to-analog converters (e.g., 930-*a*, 930-*b*, 930-*c*, 930-*d*), to convert the second data frames to analog second data frames (block 1308).

In some cases, multi-channel transmitter 220 can be configured to process the analog second data frames based on the second frequency channels thereof, using an analog transmission filter bank 290, the analog transmission filter bank 290 comprising a plurality of analog second filters (e.g., 950-*a*, 950-*b*, 950-*c*, . . . , 950-*k*) that are associated with the distinct frequency channels (block 1312). In some cases, one or more of the analog second filters (e.g., 950-*a*, 950-*b*, 950-*c*, . . . , 950-*k*) can be analog second bandpass filters. Additionally, or alternatively, in some cases, one or more of the analog second filters (e.g., 950-*a*, 950-*b*, 950-*c*, . . . , 950-*k*) can be analog second notch filters.

Figure 14:
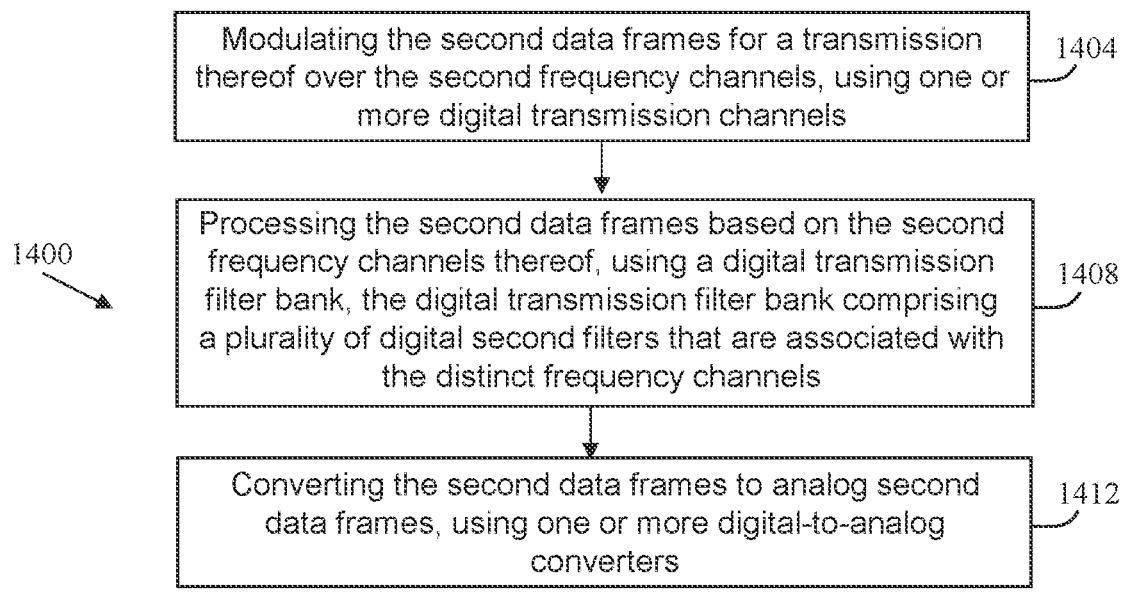
FIG. 14 is a flowchart illustrating a second example of a sequence of operations performed by the multi-channel transmitter, in accordance with the presently disclosed subject matter.

Attention is now drawn to FIG. 14, a flowchart illustrating a second example of a sequence of operations performed by multi-channel transmitter 220, in accordance with the presently disclosed subject matter.

In accordance with the presently disclosed subject matter, multi-channel transmitter 220 can be configured, using one or more digital transmission channels 910, to modulate the second data frames for a transmission thereof over the second frequency channels (block 1404).

In some cases, multi-channel transmitter 220 can be configured to process the second data frames based on the second frequency channels thereof, using a digital transmission filter bank 290, the digital transmission filter bank 290 comprising a plurality of digital second filters (e.g., 1020-*a*, 1020-*b*, 1020-*c*, . . . , 1020-*k*) that are associated with the distinct frequency channels (block 1408). In some cases, one or more of the digital second filters (e.g., 1020-*a*, 1020-*b*, 1020-*c*, . . . , 1020-*k*) can be digital second bandpass filters. Additionally, or alternatively, in some cases, one or more of the digital second filters (e.g., 1020-*a*, 1020-*b*, 1020-*c*, . . . , 1020-*k*) can be digital second notch filters.

Multi-channel transmitter 220 can also be configured, using one or more digital-to-analog converters (e.g., 930-*a*, 930-*b*, 930-*c*, 930-*d*), to convert the second data frames to analog second data frames (block 1412).

Figure 15:
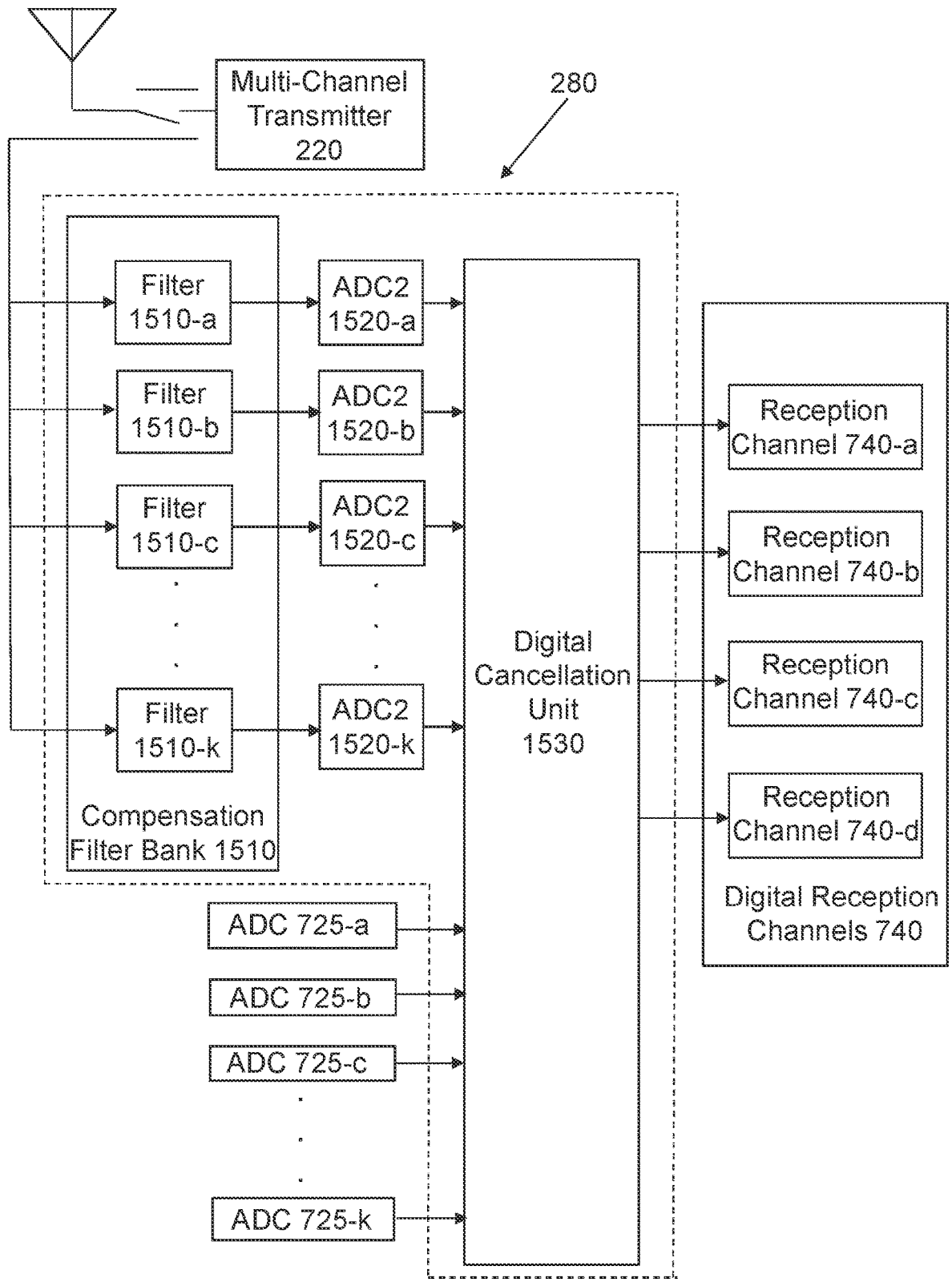
FIG. 15 is a block diagram schematically illustrating a first example of a self-interference compensation unit, in accordance with the presently disclosed subject matter.

Attention is now drawn to FIG. 15, a block diagram schematically illustrating a first example of a self-interference compensation unit 280, in accordance with the presently disclosed subject matter.

In accordance with the presently disclosed subject matter, multi-channel receiver 210 can be configured, in some cases, to include a self-interference compensation unit 280. Self-interference compensation unit 280 can be configured to compensate for an effect of self-interference on a quality of reception of the first data frames. As a result thereof, the first difference between a first frequency channel over which a respective first data slot of the respective first data frame is received during a respective first time slot of the first time slots and the second frequency channel over which at least one respective second data slot of at least one of the second data frames is transmitted during the respective first time slot that results in an expectation of a self-interference-based error in the respective first data slot is reduced.

In some cases, self-interference compensation unit 280 can be configured to include a compensation filter bank 1510, at least one second ADC (ADC2) (e.g., 1520-*a*, 1520-*b*, 1520-*c*, . . . , 1520-*k*), and a digital cancellation unit 1530.

Compensation filter bank 1510 can be configured to include a plurality of third filters (e.g., 1510-*a*, 1510-*b*, 1510-*c*, . . . , 1510-*k*), each third filter of the third filters (e.g., 1510-*a*, 1510-*b*, 1510-*c*, . . . , 1510-*k*) being associated with a respective distinct frequency channel of the distinct frequency channels that cover the common frequency band. Compensation filter bank 1510 can be configured to process (i.e., pass) the second data frames that are transmitted by the multi-channel transmitter 220 based on the second frequency channels thereof, which, as noted earlier herein, inter alia with reference to FIG. 2, are of the distinct frequency channels. In some cases, one or more of the third filters (e.g., 1510-*a*, 1510-*b*, 1510-*c*, . . . , 1510-*k*) can be bandpass filters. Additionally, or alternatively, in some cases, one or more of the third filters (e.g., 1510-*a*, 1510-*b*, 1510-*c*, . . . , 1510-*k*) can be notch filters. It is to be noted that, in some cases, compensation filter bank 1510 can be a digital compensation filter bank, and not an analog compensation filter bank that filters RF signals, as illustrated in FIG. 15. That is, the compensation filter bank 1510 can be configured to process the second data frames after the second data frames have been digitized by the at least one second ADC (ADC2). Alternatively, in some cases, the third filters can be a plurality of digital filters that are not part of a compensation filter bank 1510.

Returning to FIG. 15, the at least one second ADC (ADC2) (e.g., 1520-*a*, 1520-*b*, 1520-*c*, . . . , 1520-*k*) can be configured to digitize the second data frames.

In some cases, as illustrated in FIG. 15, a number of the second ADC's (e.g., 1520-*a*, 1520-*b*, 1520-*c*, . . . , 1520-*k*) can correspond to the number of third filters (e.g., 1510-*a*, 1510-*b*, 1510-*c*, . . . , 1510-*k*) in compensation filter bank 1510, such that, at any given time, each respective second data frame is digitized by a different second ADC (ADC2) (e.g., 1520-*a*, 1520-*b*, 1520-*c*, . . . , 1520-*k*) of the second ADC's. Alternatively, in some cases, a single second ADC can be configured to digitize all of the second data frames. As a further alternative, a plurality of second ADC's can be coupled to an output of the compensation filter bank 1510, wherein the number of second ADC's is less than the number of third filters (e.g., 1510-*a*, 1510-*b*, 1510-*c*, . . . , 1510-*k*) in compensation filter bank 1510.

Digital cancellation unit 1530 can be configured to compensate for an effect of self-interference on a quality of reception of one or more of the first data frames resulting from a transmission of one or more of the second data frames. In some cases, as illustrated in FIG. 15, digital cancellation unit 1530 can be configured to obtain digitized input radio signals that are output by the first ADC's (e.g., 725-*a*, 725-*b*, 725-*c*, . . . , 725-*k*). Digital cancellation unit 1530 can be further configured to obtain digitized second data frames transmitted over second frequency channels and output by the second ADC's (e.g., 1520-*a*, 1520-*b*, 1520-*c*, . . . , 1520-*k*). Digital cancellation unit 1530 can then be configured to remove the digitized components of the second data frames that are output by the first ADC's (e.g., 725-*a*, 725-*b*, 725-*c*, . . . , 725-*k*), using the digitized second data frames that are output by the second ADC's (e.g., 1520-*a*, 1520-*b*, 1520-*c*, . . . , 1520-*k*). In this manner, the effect of self-interference on a quality of reception of one or more of the first data frames resulting from a transmission of one or more of the second data frames can be compensated. In some cases, the digital cancellation unit 1530 can be configured to remove the digitized components of the second data frames by: (a) estimating the amplitude and phase shift associated with the second data frames in the digitized input radio signals that are output by the first ADC's (e.g., 725-*a*, 725-*b*, 725-*c*, . . . , 725-*k*); (b) generating leakage signals by multiplying the digitized second data frames output by the second ADC's (e.g., 1520-*a*, 1520-*b*, 1520-*c*, . . . , 1520-*k*) by the estimated amplitude and shifting the phase of the digitized second data frames by the estimated phase shift; and (c) subtracting the leakage signals from the digitized input radio signals.

Figure 16:
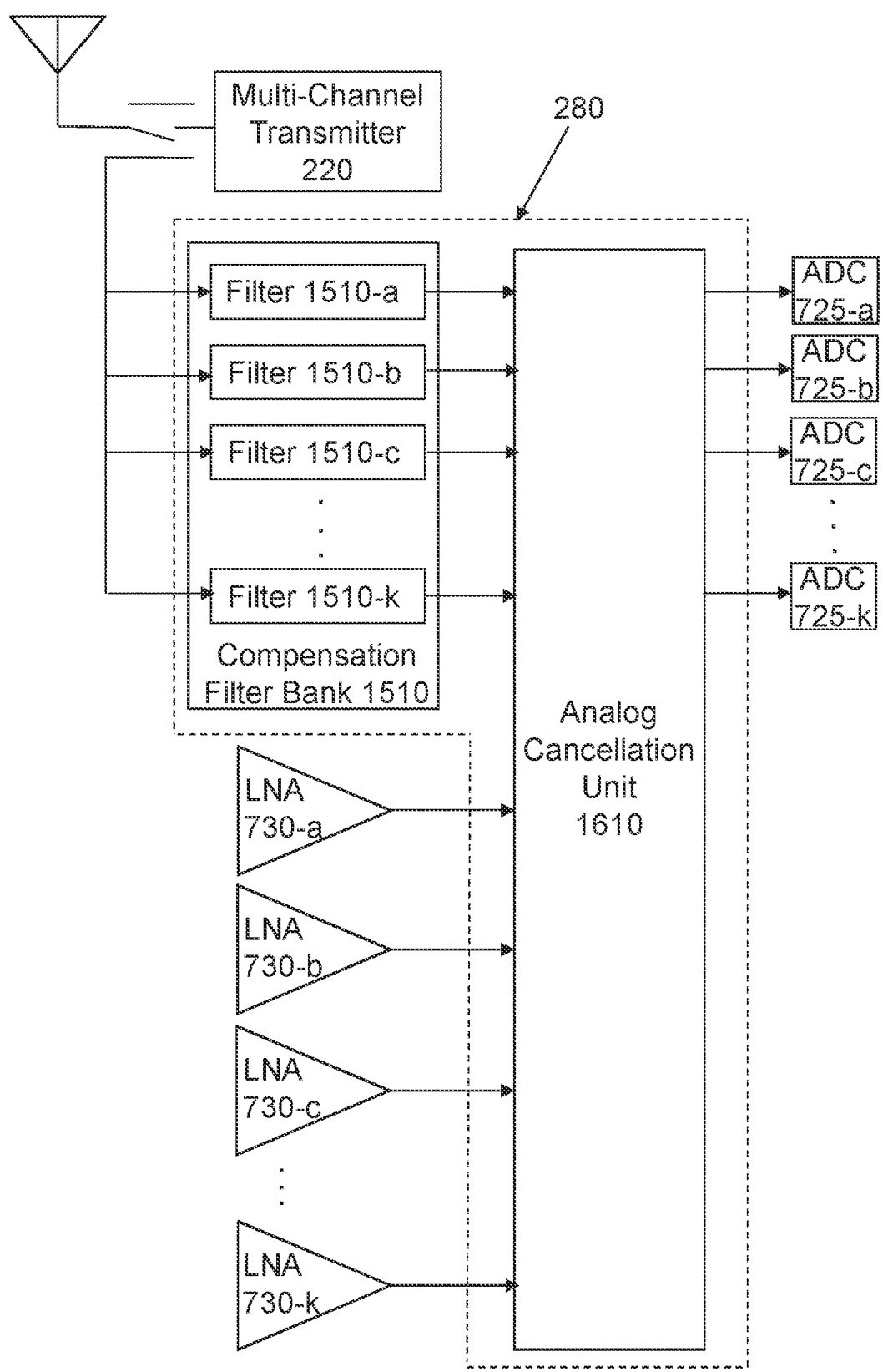
FIG. 16 is a block diagram schematically illustrating a second example of a self-interference compensation unit, in accordance with the presently disclosed subject matter.

Attention is now drawn to FIG. 16, a block diagram schematically illustrating a second example of a self-interference compensation unit 280, in accordance with the presently disclosed subject matter.

In accordance with the presently disclosed subject matter, in some cases, self-interference compensation unit 280 can be configured to include a compensation filter bank 1510 and an analog cancellation unit 1610. The compensation filter bank 1510 is described earlier herein, inter alia with reference to FIG. 15.

Analog cancellation unit 1610 can be configured to compensate for self-interference at one or more of the first data frames resulting from a transmission of one or more of the second data frames. In some cases, analog cancellation unit 1610 can be configured to obtain input radio signals, either before filtering the input radio signals by analog reception filter bank 270 or after filtering the input radio signals by the analog reception filter bank 270 (optionally, after amplification of the filtered input radio signals by the LNA's (e.g. 730-*a*, 730-*b*, 730-*c*, . . . , 730-*k*), as illustrated in FIG. 16). Analog cancellation unit 1610 can be further configured to obtain second data frames having second frequencies that are output by the compensation filter bank 1510. Analog cancellation unit 1610 can then be configured to remove the components of the second data frames in the input radio signals, using the second data frames that are output by the compensation filter bank 1510, thereby generating compensation signals. In this manner, the self-interference at one or more of the first data frames resulting from a transmission of one or more of the second data frames can be compensated. In some cases, in which the input radio signals are received by analog cancellation unit 1610 before filtering the input radio signals by analog reception filter bank 270, the compensation signals can be provided to the analog reception filter bank 270. Alternatively, in some cases, in which the input radio signals are received by analog cancellation unit 1610 after filtering the input radio signals by the analog reception filter bank 270, the compensation signals can be provided to the ADC's (e.g., 725-*a*, 725-*b*, 725-*c*, . . . , 725-*k*), as illustrated in FIG. 16.

Figure 17:
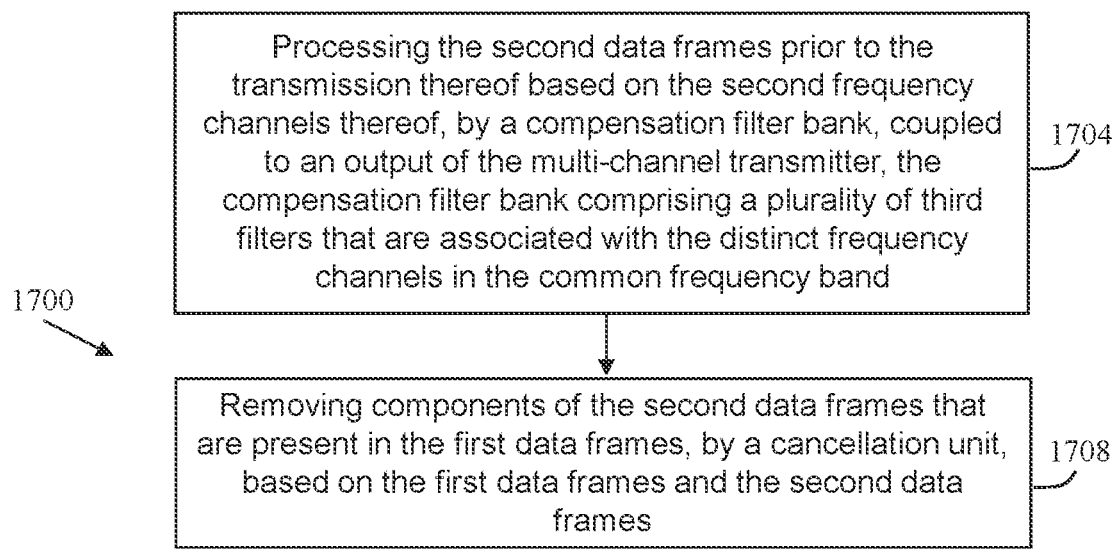
FIG. 17 is a flowchart illustrating one example of a sequence of operations performed by a self-interference compensation unit, in accordance with the presently disclosed subject matter.

Attention is now drawn to FIG. 17, a flowchart illustrating one example of a sequence of operations performed by a self-interference compensation unit 280, in accordance with the presently disclosed subject matter.

In accordance with the presently disclosed subject matter, self-interference compensation unit 280 can be configured, e.g. using a compensation filter bank 1510, coupled to an output of the multi-channel transmitter 220, to process the second data frames prior to the transmission thereof based on the second frequency channels thereof, the compensation filter bank 1510 comprising a plurality of third filters (e.g., 1510-*a*, 1510-*b*, 1510-*c*, . . . , 1510-*k*) that are associated with the distinct frequency channels in the common frequency band (block 1704). In some cases, compensation filter bank 1510 can be an analog compensation filter bank, as illustrated for example in FIGS. 15 and 16. Alternatively, in some cases, compensation filter bank 1510 can be a digital compensation filter bank, as detailed earlier herein, inter alia with reference to FIG. 15.

Moreover, self-interference compensation unit 280 can be configured, using a cancellation unit (e.g., digital cancellation unit 1530, analog cancellation unit 1610), to remove components of the second data frames that are present in the first data frames, based on the first data frames and the second data frames (block 1708).

It is to be noted that, with reference to FIGS. 5, 6, 11-14 and 17, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A radio transceiver, in a radio communications network, that is configured for full-duplex communication over a common frequency band, the transceiver comprising:
   a multi-channel receiver configured to receive, via at least one receiver antenna, one or more first data frames from a corresponding one or more first nodes of the network during a plurality of first time slots, wherein each first data frame of the first data frames includes:
   (a) a plurality of first data slots, each first data slot of the first data slots being received during a different first time slot of the first time slots over a first frequency channel, within the common frequency band, that is variable between successive first data slots of the first data slots, and (b) an error correction code (ECC);
   a multi-channel transmitter configured to transmit, via at least one transmitter antenna, one or more second data frames to a corresponding one or more second nodes of the network during the first time slots, wherein each second data frame of the second data frames includes:
   a plurality of second data slots, each second data slot of the second data slots being transmitted during a different first time slot of the first time slots over a second frequency channel, within the common frequency band, that is variable between successive second data slots of the second data slots; and
   a controller configured, for a respective first data frame of the first data frames, to use the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot;
   wherein the actual self-interference-based errors in the first data frames are statistically dispersed over the first data frames, thereby improving a capability of the ECC of each first data frame of the first data frames to correct the actual self-interference-based errors in the respective first data frame; and
   wherein the receiver comprises:
   a plurality of filters that are configured to process the first data frames, each filter of the filters being configured to process at least one distinct frequency channel of distinct frequency channels within the common frequency band; and
   a demodulator configured to demodulate the first data frames.

2. The radio transceiver of claim 1, wherein the controller is further configured, prior to the first time slots, to:
   obtain, for the respective first data frame, the first frequency channel over which the first data slots of the respective first data frame are to be received;
   obtain, for each second data frame of the second data frames, the second frequency channel over which the second data slots of the respective second data frame are to be transmitted;
   determine, for at least some of the first time slots, a given difference in frequency between the first frequency channel over which a respective first data slot of the respective first data frame is to be received during the respective first time slot and at least one respective second frequency channel over which a respective second data slot of a corresponding second data frame of the second data frames is to be transmitted during the respective first time slot, wherein a determination that the given difference is less than the first difference is indicative of at least one expected self-interference-based error in the respective first data slot of the respective first data frame; and
   estimate a capability of the ECC of the respective first data frame to correct the expected self-interference-based error, if any, wherein the ECC is estimated to be capable of correcting the expected self-interference-based error when a number of the first data slots of the respective first data frame that are expected to include one or more expected self-interference-based errors is less than or equal to a predefined number.

3. The radio transceiver of claim 2, wherein, upon estimating that the ECC is not capable of correcting the expected self-interference-based-error, the controller is configured to skip a transmission of the respective second data slot, thereby avoiding the expected self-interference-based error in the respective second data slot.

4. The radio transceiver of claim 2, wherein the controller is configured to determine the predefined number in accordance with one or more of the following: (a) a type of the ECC; (b) a code rate of the ECC; (c) an expected signal-to-noise ratio (SNR) for the respective first data frame, the expected SNR being estimated based on a measured SNR of data transmissions received by the receiver prior to the first time slots; or (d) an expected effect of radio-frequency interference that is external to the radio transceiver on the multi-channel receiver.

5. The radio transceiver of claim 1, wherein the filters are included in
   a reception filter bank, the reception filter bank being configured to process each of the first data frames based on the first frequency channel thereof, and each filter of the filters being associated with a respective distinct frequency channel of the distinct frequency channels within the common frequency band.

6. The radio transceiver of claim 5, wherein the first filters include at least one of: (a) one or more first bandpass filters, or (b) one or more first notch filters.

7. The radio transceiver of claim 5, wherein the transmitter comprises:
one or more digital transmission channels configured to modulate each of the second data frames for a transmission thereof over the second frequency channel thereof; and
a transmission filter bank configured to process each of the second data frames based on the second frequency channel thereof, the transmission filter bank comprising a plurality of second filters that are associated with the distinct frequency channels.

8. The radio transceiver of claim 7, wherein the second filters include at least one of: (a) one or more second bandpass filters, or (b) one or more second notch filters.

9. The radio transceiver of claim 7, wherein the receiver further comprises:
a self-interference compensation unit configured to compensate for an effect of self-interference on one or more of the first data frames resulting from a transmission of one or more of the second data frames, thereby reducing the first difference.

10. The radio transceiver of claim 9, wherein the self-interference compensation unit comprises:
a compensation filter bank, coupled to an output of the multi-channel transmitter, and configured to process each of the second data frames based on the second frequency channel thereof, the compensation filter bank comprising a plurality of third filters that are associated with the distinct frequency channels; and
a cancellation unit configured, based on the first data frames and the second data frames, to remove components of the second data frames that are present in the first data frames.

11. A radio communications network comprising a plurality of radio transceivers that are configured for full-duplex communication over a common frequency band, each radio transceiver of the radio transceivers comprising:
a multi-channel receiver configured to receive, via at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC);
a multi-channel transmitter configured to transmit, via at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and
a controller configured, for a respective first data frame of the first data frames, to use the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot;
wherein the actual self-interference-based errors in the first data frames are statistically dispersed over the first data frames, thereby improving a capability of the ECC of each first data frame of the first data frames to correct the actual self-interference-based errors in the respective first data frame; and
wherein the receiver comprises:
a plurality of filters that are configured to process the first data frames, each filter of the filters being configured to process at least one distinct frequency channel of distinct frequency channels within the common frequency band; and
a demodulator configured to demodulate the first data frames.

12. A method for full-duplex communication over a common frequency band, the method comprising:
receiving, by a multi-channel receiver of a radio transceiver in a radio communications network, via at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC);
transmitting, by a multi-channel transmitter of the radio transceiver, via at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and
for a respective first data frame of the first data frames, using the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot;
wherein the actual self-interference-based errors in the first data frames are statistically dispersed over the first data frames, thereby improving a capability of the ECC of each first data frame of the first data frames to correct the actual self-interference-based errors in the respective first data frame; and wherein the receiving comprises:

processing the first data frames, by a plurality of filters, each filter of the filters being configured to process at least one distinct frequency channel of distinct frequency channels within the common frequency band; and demodulating the first data frames, by a demodulator.

13. The method of claim 12, further comprising:

obtaining, for the respective first data frame, prior to the first time slots, the first frequency channel over which the first data slots of the respective first data frame are to be received;

obtaining, for each second data frame of the second data frames, prior to the first time slots, the second frequency channel over which the second data slots of the respective second data frame are to be transmitted;

determining, for at least some of the first time slots, a given difference in frequency between the first frequency channel over which a respective first data slot of the respective first data frame is to be received during the respective first time slot and at least one respective second frequency channel over which a respective second data slot of a corresponding second data frame of the second data frames is to be transmitted during the respective first time slot, wherein a determination that the given difference is less than the first difference is indicative of at least one expected self-interference-based error in the respective first data slot of the respective first data frame; and estimating a capability of the ECC of the respective first data frame to correct the expected self-interference-based error, if any, wherein the ECC is estimated to be capable of correcting the expected self-interference-based error when a number of the first data slots of the respective first data frame that are expected to include one or more expected self-interference-based errors is less than or equal to a predefined number.

14. The method of claim 13, wherein, upon estimating that the ECC is not capable of correcting the expected self-interference-based-error, the method further comprises:

skipping a transmission of the respective second data slot, thereby avoiding the expected self-interference-based error in the respective second data slot.

15. The method of claim 13, further comprising:

determining the predefined number in accordance with one or more of the following: (a) a type of the ECC; (b) a code rate of the ECC; (c) an expected signal-to-noise ratio (SNR) for the respective first data frame, the expected SNR being estimated based on a measured SNR of data transmissions received by the receiver prior to the first time slots; or (d) an expected effect of radio-frequency interference that is external to the radio transceiver on the multi-channel receiver.

16. The method of claim 12, wherein the filters are included in a reception filter bank;

wherein the first data frames are processed based on the first frequency channel thereof, by the reception filter bank; and wherein each filter of the filters is associated with a respective distinct frequency channel of the distinct frequency channels within the common frequency band.

17. The method of claim 16, wherein the transmitting comprises:

modulating each of the second data frames for a transmission thereof over the second frequency channel thereof, by one or more digital transmission channels; and processing each of the second data frames based on the second frequency channel thereof, by a transmission filter bank comprising a plurality of second filters that are associated with the distinct frequency channels.

18. The method of claim 17, wherein the receiving further comprises:

compensating for an effect of self-interference on one or more of the first data frames resulting from a transmission of one or more of the second data frames, thereby reducing the first difference.

19. The method of claim 18, wherein the compensating comprises:

processing each of the second data frames based on the second frequency channel thereof, by a compensation filter bank, coupled to an output of the multi-channel transmitter, the compensation filter bank comprising a plurality of third filters that are associated with the distinct frequency channels; and removing components of the second data frames that are present in the first data frames, based on the first data frames and the second data frames.

20. A method for full-duplex communication over a common frequency band in a radio communications network comprising a plurality of radio transceivers, the method comprising:

receiving, by at least one multi-channel receiver of a corresponding at least one radio transceiver of the radio transceivers, via a respective at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC);

transmitting, by at least one multi-channel transmitter of the corresponding at least one radio transceiver, via a respective at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and for a respective first data frame of the first data frames, using the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot;

wherein the actual self-interference-based errors in the first data frames are statistically dispersed over the first data frames, thereby improving a capability of the ECC of each first data frame of the first data frames to correct the actual self-interference-based errors in the respective first data frame; and wherein the receiving comprises:

processing the first data frames, by a plurality of filters, each filter of the filters being configured to process at least one distinct frequency channel of distinct frequency channels within the common frequency band; and demodulating the first data frames, by a demodulator.

21. A non-transitory computer readable storage medium having computer readable program code embodied therewith, the computer readable program code, executable by at least one processor of a computer to perform a method for full-duplex communication over a common frequency band, the method comprising:

receiving, by a multi-channel receiver of a radio transceiver in a radio communications network, via at least one receiver antenna, one or more first data frames from a corresponding one or more first nodes of the network during a plurality of first time slots, wherein each first data frame of the first data frames includes: (a) a plurality of first data slots, each first data slot of the first data slots being received during a different first time slot of the first time slots over a first frequency channel, within the common frequency band, that is variable between successive first data slots of the first data slots, and (b) an error correction code (ECC);

transmitting, by a multi-channel transmitter of the radio transceiver, via at least one transmitter antenna, one or more second data frames to a corresponding one or more second nodes of the network during the first time slots, wherein each second data frame of the second data frames includes: a plurality of second data slots, each second data slot of the second data slots being transmitted during a different first time slot of the first time slots over a second frequency channel, within the common frequency band, that is variable between successive second data slots of the second data slots; and for a respective first data frame of the first data frames, using the ECC of the respective first data frame to correct one or more actual self-interference-based errors in the respective first data frame, if any, each of the actual self-interference-based errors resulting from a difference in frequency that is less than a first difference between the first frequency channel over which a respective first data slot of the respective first data frame is received during a respective first time slot of the first time slots and the second frequency channel over which at least one respective second data slot of at least one of the second data frames is transmitted during the respective first time slot;

wherein the actual self-interference-based errors in the first data frames are statistically dispersed over the first data frames, thereby improving a capability of the ECC of each first data frame of the first data frames to correct the actual self-interference-based errors in the respective first data frame; and wherein the receiving comprises:

processing the first data frames, by a plurality of filters, each filter of the filters being configured to process at least one distinct frequency channel of distinct frequency channels within the common frequency band; and demodulating the first data frames, by a demodulator.

* * * * *